(12) United States Patent
Hodgkinson et al.

(10) Patent No.: US 8,370,913 B2
(45) Date of Patent: Feb. 5, 2013

(54) POLICY-BASED AUDITING OF IDENTITY CREDENTIAL DISCLOSURE BY A SECURE TOKEN SERVICE

(75) Inventors: Andrew A. Hodgkinson, Pleasant Grove, UT (US); Duane F. Buss, West Mountain, UT (US); Thomas E. Doman, Pleasant Grove, UT (US); Patrick R. Felsted, Cedar Hills, UT (US); James G. Sermersheim, Woodland Hills, UT (US)

(73) Assignee: Apple Inc., Cupertino, CA (US)

( * ) Notice: Subject to any disclaimer, the term of this patent is extended or adjusted under 35 U.S.C. 154(b) by 1232 days.

(21) Appl. No.: 11/843,638

(22) Filed: Aug. 22, 2007

(65) Prior Publication Data

US 2008/0229384 A1 Sep. 18, 2008

Related U.S. Application Data

(60) Provisional application No. 60/895,312, filed on Mar. 16, 2007, provisional application No. 60/895,316, filed on Mar. 16, 2007, provisional application No. 60/895,325, filed on Mar. 16, 2007.

(51) Int. Cl.
*H04L 29/06* (2006.01)
*G06F 15/16* (2006.01)
*G06Q 20/00* (2012.01)

(52) U.S. Cl. ........... 726/9; 726/1; 726/27; 705/65
(58) Field of Classification Search .................. None
See application file for complete search history.

(56) References Cited

U.S. PATENT DOCUMENTS

| | | | |
|---|---|---|---|
| 3,614,839 A | 10/1971 | Thomas | |
| 3,949,501 A | 4/1976 | Andrews et al. | |
| 4,153,931 A | 5/1979 | Green et al. | |
| 4,568,403 A | 2/1986 | Egan | |
| 4,730,848 A | 3/1988 | McCormick | |
| 5,073,950 A | 12/1991 | Colbert et al. | |
| 5,485,510 A | 1/1996 | Colbert | |
| 5,546,471 A | 8/1996 | Merjanian | |
| 5,546,523 A | 8/1996 | Gatto | |
| 5,594,806 A | 1/1997 | Colbert | |
| 5,613,012 A | 3/1997 | Hoffman et al. | |
| 5,848,412 A | 12/1998 | Rowland et al. | |
| 6,028,950 A | 2/2000 | Merjanian | |
| 6,055,595 A | 4/2000 | Tachibana et al. | |

(Continued)

FOREIGN PATENT DOCUMENTS

| EP | 0917120 | 5/1999 |
|---|---|---|
| JP | 11003382 | 1/1999 |

(Continued)

OTHER PUBLICATIONS

Computer Security Institute; "What InfoCard is and Isn't"; http://web.archive.org/web/20060423133 805/http:/www.identityblog.com/wp-content/resources/alert.pdf, May 2006 (4 pages).

(Continued)

*Primary Examiner* — Christopher Revak
(74) *Attorney, Agent, or Firm* — Blakely, Sokoloff, Taylor & Zafman LLP

(57) ABSTRACT

A user defines an audit policy. The audit policy identifies one or more triggers that, when related information is included in a security token, trigger the performance of the audit. The audit can include notifying the user in some manner that the trigger occurred. The audit can require in-line confirmation of the audit, so that the security token is not transmitted until the user confirms the audit.

24 Claims, 26 Drawing Sheets

U.S. PATENT DOCUMENTS

| | | | |
|---|---|---|---|
| 6,327,578 B1 | 12/2001 | Linehan | |
| 6,363,488 B1 * | 3/2002 | Ginter et al. | 726/1 |
| 6,481,621 B1 | 11/2002 | Herrendoerfer et al. | |
| 6,513,721 B1 | 2/2003 | Salmre et al. | |
| 6,612,488 B2 * | 9/2003 | Suzuki | 235/380 |
| 6,721,713 B1 | 4/2004 | Guheen et al. | |
| 6,880,155 B2 | 4/2005 | Schwabe et al. | |
| 6,913,194 B2 * | 7/2005 | Suzuki | 235/380 |
| 6,970,836 B1 * | 11/2005 | Paltenghe et al. | 705/18 |
| 7,003,501 B2 * | 2/2006 | Ostroff | 705/76 |
| 7,103,575 B1 | 9/2006 | Linehan | |
| 7,104,444 B2 * | 9/2006 | Suzuki | 235/380 |
| 7,210,620 B2 * | 5/2007 | Jones | 235/380 |
| 7,225,156 B2 | 5/2007 | Fisher et al. | |
| 7,231,369 B2 | 6/2007 | Hirabayashi | |
| 7,343,351 B1 | 3/2008 | Bishop et al. | |
| 7,353,532 B2 | 4/2008 | Duri et al. | |
| 7,360,237 B2 | 4/2008 | Engle et al. | |
| 7,416,486 B2 | 8/2008 | Walker et al. | |
| 7,444,519 B2 | 10/2008 | Laferriere et al. | |
| 7,487,920 B2 | 2/2009 | Sato et al. | |
| 7,494,416 B2 | 2/2009 | Walker et al. | |
| 7,500,607 B2 | 3/2009 | Williams | |
| 7,529,698 B2 * | 5/2009 | Joao | 705/30 |
| 7,537,152 B2 * | 5/2009 | Chakiris et al. | 235/375 |
| RE40,753 E | 6/2009 | Wang et al. | |
| 7,555,460 B1 * | 6/2009 | Barkan | 705/39 |
| 7,565,329 B2 | 7/2009 | Lapsley et al. | |
| 7,591,424 B2 | 9/2009 | Wang et al. | |
| 7,594,258 B2 | 9/2009 | Mao et al. | |
| 7,610,040 B2 * | 10/2009 | Cantini et al. | 455/410 |
| 7,613,659 B1 | 11/2009 | Hoffman et al. | |
| 7,620,177 B2 | 11/2009 | Ibrahim et al. | |
| 7,636,941 B2 | 12/2009 | Blinn et al. | |
| 7,661,585 B2 * | 2/2010 | Joao | 235/379 |
| 7,664,022 B2 | 2/2010 | Hu | |
| 7,747,540 B2 | 6/2010 | Cameron et al. | |
| 7,771,273 B2 | 8/2010 | Walker et al. | |
| 7,788,499 B2 | 8/2010 | Cameron et al. | |
| 7,797,413 B2 | 9/2010 | Adelman et al. | |
| 7,797,434 B2 | 9/2010 | Blakley et al. | |
| 7,831,522 B1 | 11/2010 | Satish et al. | |
| 7,860,883 B2 | 12/2010 | Hinton et al. | |
| 2001/0007983 A1 * | 7/2001 | Lee | 705/69 |
| 2002/0026397 A1 | 2/2002 | Ieta et al. | |
| 2002/0029337 A1 * | 3/2002 | Sudia et al. | 713/176 |
| 2002/0029342 A1 * | 3/2002 | Keech | 713/184 |
| 2002/0046041 A1 | 4/2002 | Lang | |
| 2002/0095360 A1 * | 7/2002 | Joao | 705/30 |
| 2002/0103801 A1 | 8/2002 | Lyons | |
| 2002/0116647 A1 | 8/2002 | Mont et al. | |
| 2002/0178370 A1 | 11/2002 | Gurevich et al. | |
| 2003/0061170 A1 * | 3/2003 | Uzo | 705/64 |
| 2003/0126094 A1 | 7/2003 | Fisher et al. | |
| 2003/0158960 A1 | 8/2003 | Engberg | |
| 2003/0172090 A1 | 9/2003 | Asunmaa et al. | |
| 2003/0217140 A1 | 11/2003 | Burbeck et al. | |
| 2003/0218062 A1 | 11/2003 | Noriega et al. | |
| 2004/0019571 A1 | 1/2004 | Hurwitz et al. | |
| 2004/0034440 A1 | 2/2004 | Middlebrook | |
| 2004/0128392 A1 | 7/2004 | Blakley et al. | |
| 2004/0162786 A1 | 8/2004 | Cross et al. | |
| 2004/0199475 A1 | 10/2004 | Rivest et al. | |
| 2004/0199787 A1 | 10/2004 | Hans et al. | |
| 2004/0230831 A1 | 11/2004 | Spelman et al. | |
| 2005/0027713 A1 | 2/2005 | Cameron et al. | |
| 2005/0033692 A1 | 2/2005 | Jarman et al. | |
| 2005/0044423 A1 | 2/2005 | Mellmer et al. | |
| 2005/0091543 A1 | 4/2005 | Holtzman et al. | |
| 2005/0097550 A1 | 5/2005 | Schwabe et al. | |
| 2005/0124320 A1 | 6/2005 | Ernst et al. | |
| 2005/0135240 A1 | 6/2005 | Ozugur | |
| 2005/0229005 A1 | 10/2005 | Le Saint et al. | |
| 2005/0247777 A1 | 11/2005 | Pitroda | |
| 2005/0247797 A1 | 11/2005 | Ramachandran | |
| 2005/0289080 A1 * | 12/2005 | Rhiando | 705/64 |
| 2006/0136990 A1 | 6/2006 | Hinton et al. | |
| 2006/0200424 A1 | 9/2006 | Cameron et al. | |
| 2006/0206931 A1 | 9/2006 | Dillaway et al. | |
| 2006/0224611 A1 | 10/2006 | Dunn et al. | |
| 2006/0235796 A1 | 10/2006 | Johnson et al. | |
| 2007/0016484 A1 | 1/2007 | Waters et al. | |
| 2007/0016943 A1 | 1/2007 | M'Raihl et al. | |
| 2007/0043651 A1 | 2/2007 | Xiao et al. | |
| 2007/0061567 A1 | 3/2007 | Day et al. | |
| 2007/0118449 A1 * | 5/2007 | De La Motte | 705/35 |
| 2007/0143835 A1 | 6/2007 | Cameron et al. | |
| 2007/0192245 A1 | 8/2007 | Fisher et al. | |
| 2007/0203852 A1 | 8/2007 | Cameron et al. | |
| 2007/0204168 A1 | 8/2007 | Cameron et al. | |
| 2007/0204325 A1 | 8/2007 | Cameron et al. | |
| 2007/0208869 A1 | 9/2007 | Adelman et al. | |
| 2007/0208940 A1 | 9/2007 | Adelman et al. | |
| 2007/0214079 A1 | 9/2007 | Mears | |
| 2007/0214429 A1 | 9/2007 | Lyudovyk et al. | |
| 2007/0282951 A1 | 12/2007 | Selimis et al. | |
| 2007/0294431 A1 | 12/2007 | Adelman et al. | |
| 2008/0003977 A1 * | 1/2008 | Chakiris et al. | 455/407 |
| 2008/0010675 A1 | 1/2008 | Massascusa et al. | |
| 2008/0071808 A1 | 3/2008 | Hardt et al. | |
| 2008/0098228 A1 | 4/2008 | Anderson et al. | |
| 2008/0140576 A1 * | 6/2008 | Lewis et al. | 705/67 |
| 2008/0141366 A1 | 6/2008 | Cross et al. | |
| 2008/0162297 A1 | 7/2008 | Hershkovitz et al. | |
| 2008/0178271 A1 | 7/2008 | Gajjala et al. | |
| 2008/0178272 A1 | 7/2008 | Gajjala et al. | |
| 2008/0184339 A1 | 7/2008 | Shewchuk et al. | |
| 2008/0189778 A1 | 8/2008 | Rowley | |
| 2008/0196096 A1 | 8/2008 | Grynberg | |
| 2008/0222714 A1 | 9/2008 | Wahl | |
| 2008/0229410 A1 | 9/2008 | Felsted et al. | |
| 2008/0235144 A1 | 9/2008 | Phillips | |
| 2008/0244722 A1 | 10/2008 | Satish et al. | |
| 2008/0256594 A1 | 10/2008 | Satish et al. | |
| 2008/0263644 A1 | 10/2008 | Grinstein | |
| 2008/0289020 A1 | 11/2008 | Cameron et al. | |
| 2008/0301784 A1 | 12/2008 | Zhu et al. | |
| 2008/0313567 A1 | 12/2008 | Sabin et al. | |
| 2009/0013391 A1 | 1/2009 | Ernst | |
| 2009/0037920 A1 | 2/2009 | Brown et al. | |
| 2009/0077118 A1 | 3/2009 | Doman et al. | |
| 2009/0077627 A1 | 3/2009 | Doman et al. | |
| 2009/0089625 A1 | 4/2009 | Kannappan et al. | |
| 2009/0089870 A1 | 4/2009 | Wahl | |
| 2009/0089871 A1 | 4/2009 | Murphy et al. | |
| 2009/0099860 A1 | 4/2009 | Karabulut et al. | |
| 2009/0125558 A1 | 5/2009 | Suh | |
| 2009/0131157 A1 | 5/2009 | Hedrick et al. | |
| 2009/0138398 A1 | 5/2009 | Cole et al. | |
| 2009/0178112 A1 | 7/2009 | Doman et al. | |
| 2009/0186701 A1 | 7/2009 | Rowe et al. | |
| 2009/0199284 A1 | 8/2009 | Sanders et al. | |
| 2009/0204622 A1 | 8/2009 | Sanders et al. | |
| 2009/0205014 A1 | 8/2009 | Doman et al. | |
| 2009/0205035 A1 | 8/2009 | Sermersheim et al. | |
| 2009/0216666 A1 * | 8/2009 | Antao et al. | 705/30 |
| 2009/0241178 A1 | 9/2009 | Burch et al. | |
| 2009/0249430 A1 | 10/2009 | Buss et al. | |
| 2009/0251749 A1 | 10/2009 | O'Boyle et al. | |
| 2009/0254476 A1 | 10/2009 | Sharma et al. | |
| 2009/0254483 A1 * | 10/2009 | Barkan | 705/64 |
| 2009/0260064 A1 * | 10/2009 | McDowell et al. | 726/4 |
| 2009/0300512 A1 | 12/2009 | Ahn | |
| 2009/0300747 A1 | 12/2009 | Ahn | |
| 2009/0320095 A1 | 12/2009 | Nanda et al. | |
| 2009/0328166 A1 | 12/2009 | Burch et al. | |
| 2010/0037303 A1 | 2/2010 | Sharif et al. | |
| 2010/0274691 A1 * | 10/2010 | Hammad et al. | 705/30 |
| 2011/0023103 A1 | 1/2011 | Dietrich et al. | |

FOREIGN PATENT DOCUMENTS

| | | |
|---|---|---|
| JP | 11039540 | 2/1999 |
| JP | 11154260 | 6/1999 |
| WO | WO98/23062 | 5/1998 |
| WO | WO2008/088945 | 7/2008 |

OTHER PUBLICATIONS

Cameron, Kim et al; "Design Rationale behind the Identity Metasystem Architecture"; http://www.identityblog.com/, http://research.microsoft.com/~mbj/; Mar. 16, 2006, pp. 1-11.

Hoang et al.; "Secure Roaming with Identity Metasystems"; ACM 978-1-60558-006-1; http://portal.acm.org/citation.cfm?id=1373297; 2008, pp. 36-47.

"The Resource STS: R-STS, RP-STS, A-STS . . . the other face of token issuing"; Vibro.NET; http://209.85.175.104/search?q=cache:mFlf-sZFBLsJ:blogs.msdn.comlvbertocci/arch ive/2007/09/24/the-resource-sts-r-sts-rp-sts-a-sts-the- other-face-of-token-issuing.aspx+microsoft+age+STS+RP&hl=en&ct=clnk&cd=2 &gl=us&client=firefox-a; MSDN Blogs; 2007, pp. 1-7.

"Identity Selector Interoperability Profile specification and companion guides"; Microsoft Download Center; http://www.microsoft.com/downloads/details.aspx?DisplayLang=en &FamilyID=b94817fc-3991-4ddO-8e85-b73e626f6764; Microsoft Corporation; 2007.

Nanda, Arun; Identity Selector Interoperability Profile V1.0; Microsoft Download Center, http://download.microsoft. com/down load/1/1/a/11 ac6505-e4cO-4e05-987c-6f1 d31855cd2/Identity-Selector-Interop-Profile-v1 .pdf; Microsoft Corporation; Apr. 2007, pp. 1-52.

Microsoft Corporation, Ping Identity Corporation, "An Implementer's Guide to the Identity Selector Interoperability Profile V1.0"; Microsoft Download Center, http://download.microsoft.com/download/1/1/a/11ac6505-e4cO-4e05-987c-6f1d31855cd2/Identity-Seletor-Interop-Profile-v1-Guide.pdf; Microsoft Corporation; Apr. 2007, pp. 1-74.

Jones, Michael B.; "A Guide to Using the Indentity Selector interoperability Profile V1.0 within Web Applications and Browsers"; Microsoft Download Center; http://download.microsoft.com/download/1/1/a/11ac6505-e4cO-4e05-987c-6f1 d31855cd2/Identity-Selector-Interop-Profile-v1-Web-Guide.pdf; Microsoft Corporation; Apr. 2007, pp. 1-14.

Jones, Michael B., "Michael B. Jones Homepage"; http://research.microsoft.com/en-us/um-people/mbj; Aug. 12, 2009, pp. 1-4.

Jones, Michael B., "Mike Jones: self-issued"; http://research.microsoft.com/en-us/um-people/mbj; Aug. 12, 2009, pp. 1-45.

Just, Mike; "Designing Authentication Systems with Challenge Questions"; Security and Usability, Lorrie Faith Cranor and Simson Garfinkel (eds.); O'Reilly Media, Inc., Sebastopol, CA; Aug. 5, 2005; Chapter 8, pp. 147-160.

"PwdHash From Stanford—Generate Passwords by Hashing the URL"; Don't Learn to HACK -Hack to Learn, http://www.darknet.org.uk/2007/03/pwdhash-from-stanford-generate; Darknet; Mar. 13, 2007, pp. 1-8.

"Microsoft's Vision for an Identity Metasystem"; http://www.identityblog.com/stories/2005/07/05/IdentityMetasystem.htm; Microsoft Corporation; May 2005, pp. 1-10.

Gnucitizen, "Attacking Password Recovery Facilities"; http://www/gnucitizen.org/blog/attacking-password-recovery-facilities; Jul. 6, 2007, pp. 1-4.

Sol, S., "The Display (GUI) Layer" Intro to the Web Application Development Environment, http://web.archive.org/web/20001119171800/http://extropia.com/tutorials/devenv/gui.html>, Nov. 19, 2000, pp. 1-10, XP002517142.

Cambridge, "Cambridge Dictionary Online", Internet Article, http://dictionary.cambridge.org/define.asp?key=11419&dict=CALD>, Feb. 16, 2009, XP002517143.

Harjanto, A., "InfoCard and Browser Integration", Internet Article, http://blogs.msdn.com/andyhar/archive/2006/02/20/535333.aspx>, Feb. 17, 2006, XP002517147.

Dingle, P., "Identity Selectors & Browser Detection", Internet Article, http://eternallyoptimistic.com/2006/11/05/identity-selectors-browser-detection/>, Nov. 5, 2006, XP002517148.

Techtree News Staff, "Infocard Spells End of Passwords", Internet Article, http://www.techtree.com/techtree/jsp/article.jsp?print=1 &article_id=71396&cat_id=582>, Feb. 16, 2006, XP002517144.

Tewfiq El Maliki et al.; A Survey of User-centric Identity Management Technologies; Emerging Security Information Systems, and Technologies, 2007, pp. 12-17.

Sanders, T., "IBM/Novell unveil rival to Microsoft Infocard", Internet Article, http://www.vnunet.com/articles/print/2151060>, Feb. 26, 2006, XP002517145.

Cameron, K., "Bill Gates, Inforcards and the Identity Metasystem", Internet Article, http://www.identityblog.com/?p=374>, Feb. 19, 2006, XP002517146.

Darknet (2007), "Don't Learn to Hack—Hack to Learn". Retrieved from http://www.darknet.org.uk/2007/03/pwdhash-from-stanford-generate-passwords-by-hashing-the-url, pp. 1-7.

Allan, A. (2003), "Best Practices for Managing Passwords: Self-Service Q&A". Published by Garner, Inc. at Tutorials, TU-20-2040, pp. 1-5.

Microsoft Corporation, Ping Identity Corporation (Aug. 2005), "A Guide to Integrating with InfoCard v1.0", XP007908505, pp. 1-62.

David Chappell, "Introducing Windows CardSpace", Windows Vista Technical Articles, http://msdn2.microsoft.com/en-us/library/aa480189(d=printer).aspx, Apr. 2006, pp. 1-13.

The Higgins Foundation, "Higgins FAQ", http://www.eclipse.org/higgins/faq.php, printed Aug. 13, 2007, pp. 1-2.

"Components—Eclipsepedia", http://wiki.eclipse.org/Components, printed Aug. 13, 2007, pp. 1-8.

"Architecture—Eclipsepedia", http://wiki.eclipse.org/index.php/Architecture, printed Aug. 13, 2007, pp. 1-2.

U.S. Appl. No. 11/395,725, filed Mar. 31, 2006, entitled "Methods and Systems for Multi-Factor Authentication".

Gralla, Preston; "How the Internet Works"; Millennium Ed. Que, Aug. 1999.

Microsoft Corporation, "Microsofts Vision for an Identity Metasystem" http://msdn.microsoft.com/en-us/library/ms996422.aspx, May 2005, pp. 1-7.

Nagarkar, V., "How to Drag Drop in javascript (Part I)", Internet Article, http://www.codeproject.com/KB/scripting/DragDrip_Part_1_.aspx, Jun. 11, 2006 (12 pages).

Alrodhan, et al., "Addressing privacy issues in CardSpace", 2007, IEEE, pp. 285-291.

* cited by examiner

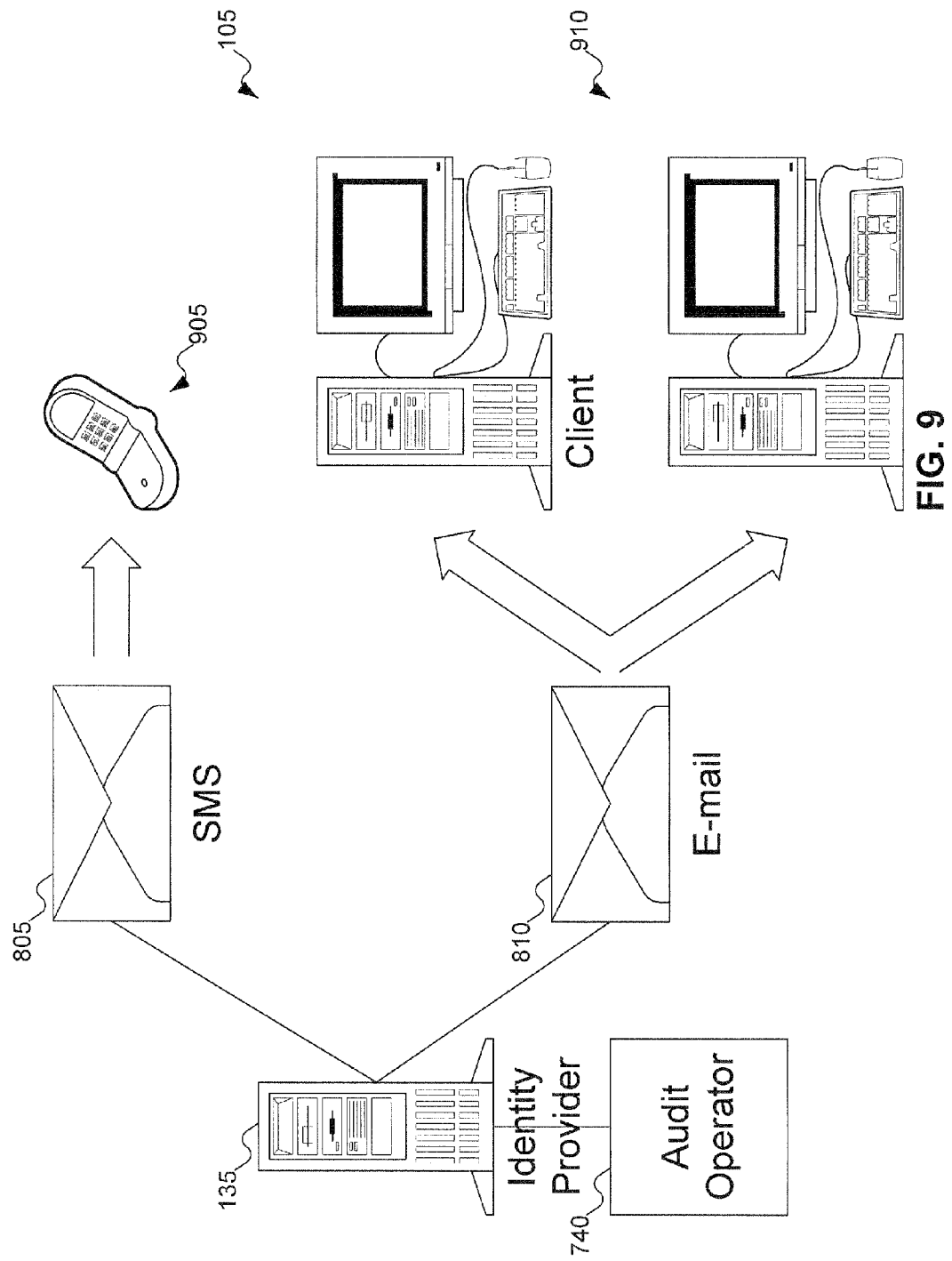

POLICY-BASED AUDITING OF IDENTITY CREDENTIAL DISCLOSURE BY A SECURE TOKEN SERVICE

RELATED APPLICATION DATA

This patent application claims the benefit of U.S. Provisional Patent Application Ser. No. 60/895,312, filed Mar. 16, 2007, of U.S. Provisional Patent Application Ser. No. 60/895,316, filed Mar. 16, 2007, and of U.S. Provisional Patent Application Ser. No. 60/895,325, filed Mar. 16, 2007, all of which are hereby incorporated by reference for all purposes.

This patent application is related to co-pending U.S. patent application Ser. No. 11/843,572 filed Aug. 22, 2007, and to co-pending U.S. patent application Ser. No. 11/843,640, filed Aug. 22, 2007, both of which claim the benefit of U.S. Provisional Patent Application Ser. No. 60/895,325, filed Mar. 16, 2007, of U.S. Provisional Patent Application Ser. No. 60/895,312, filed Mar. 16, 2007, and of U.S. Provisional Patent Application Ser. No. 60/895,316, filed Mar. 16, 2007, all of which are all hereby incorporated by reference for all purposes.

FIELD OF THE INVENTION

This invention pertains to performing on-line transactions, and more particularly to user-controlled audits of on-line transactions.

BACKGROUND OF THE INVENTION

When a user interacts with sites on the Internet (hereafter referred to as "service providers" or "relying parties"), the service provider often expects to know something about the user that is requesting the services of the provider. The typical approach for a service provider is to require the user to log into or authenticate to the service provider's computer system. But this approach, while satisfactory for the service provider, is less than ideal to the user. First, the user must remember a username and password for each service provider who expects such information. Given that different computer systems impose different requirements, and the possibility that another user might have chosen the same username, the user might be unable to use the same username/password combination on each such computer system. (There is also the related problem that if the user uses the same username/password combination on multiple computer systems, someone who hacks one such computer system would be able to access other such computer systems.) Second, the user has no control over how the service provider uses the information it stores. If the service provider uses the stored information in a way the user does not want, the user has relatively little ability to prevent such abuse, or recourse after the fact.

To address this problem, new systems have been developed that allow the user a measure of control over the information stored about the user. Windows CardSpace™ (sometimes called CardSpace) is a Microsoft implementation of an identity meta-system that offers a solution to this problem. (Microsoft, Windows, and CardSpace are either registered trademarks or trademarks of Microsoft Corporation in the United States and/or other countries.) A user can store identity information with an identity provider the user trusts. When a service provider wants some information about the user, the user can control the release of information stored with the identity provider to the service provider. The user can then use the offered services that required the identity information.

One problem with this model is that the service provider is only concerned with making sure the service provider is not defrauded by someone posing as the user. The service provider is concerned with protecting their legal liability, not in protecting the user's information. While this concern partially parallels a concern of the user, the concerns do not overlap.

Another problem can occur if a third party is able to convince the identity provider to release the user's information (for example, by sufficiently "authenticating" to the identity provider as the user): the user has no way to know this release has occurred. Such a subversion of information, commonly termed "identity theft" today, is a major concern to users whose identities are stolen. Users whose identities are stolen face a major hassle in clearing the record of the charges made improperly in their names: this hassle can sometimes takes years to resolve and can have major financial implications for the users in the long term. For example, charges that are not paid are often reported to credit bureaus and have a negative impact on the users' credit ratings. A user who was about to take out a mortgage to purchase a house might find themselves forced to pay a higher interest rate or be considered a higher risk loan borrower. This kind of impact to users can be even more onerous than the time it takes to fix the records at the credit bureaus.

Banks also suffer as a consequence of identity theft. If a bank makes a payment ostensibly on behalf of a user but that was actually charged by someone who had stolen the user's identity, the bank will probably not be able to recover the lost funds. For example, credit card agreements often agree to limit customer liability for fraudulent charges to $50 if the customer reports the fraudulent charge quickly enough. As both the user and the merchant were relying on the bank to properly authenticate the user before issuing payment, the bank usually ends up bearing the loss for the fraud.

Yet another problem with this model is that the use of such systems requires that the information card(s) be stored on the local machine. If the user is using a machine that is not generally available to the public (for example, a work computer or a computer in the user's home), this limitation might not be a great concern. But if a user is attempting to perform the transaction from a public computer, such as a computer in a public library, the user might not want to install such information cards on the public computer. First, it might not be possible to remove the information cards once installed. Second, the user might forget to uninstall the information cards, leaving them on the computer where someone else might be able to access and use them.

A need remains for a way to addresses these and other problems associated with the prior art.

SUMMARY OF THE INVENTION

In an embodiment of the invention, a user specifies a user-centric audit policy that can be enforced by an identity provider. The user specifies the event (or events) that trigger an audit and defines the actions that occur to complete the audit policy. The identity provider complies with the terms and conditions of the trigger and action. When the trigger occurs, the audit action is performed, informing the user aware of the occurrence of the trigger.

The foregoing and other features, objects, and advantages of the invention will become more readily apparent from the following detailed description, which proceeds with reference to the accompanying drawings.

BRIEF DESCRIPTION OF THE DRAWINGS

FIG. 9 shows how audit actions can be transmitted to the user in the audit service of FIG. 7.

DETAILED DESCRIPTION OF THE PREFERRED EMBODIMENT

Figure 1:
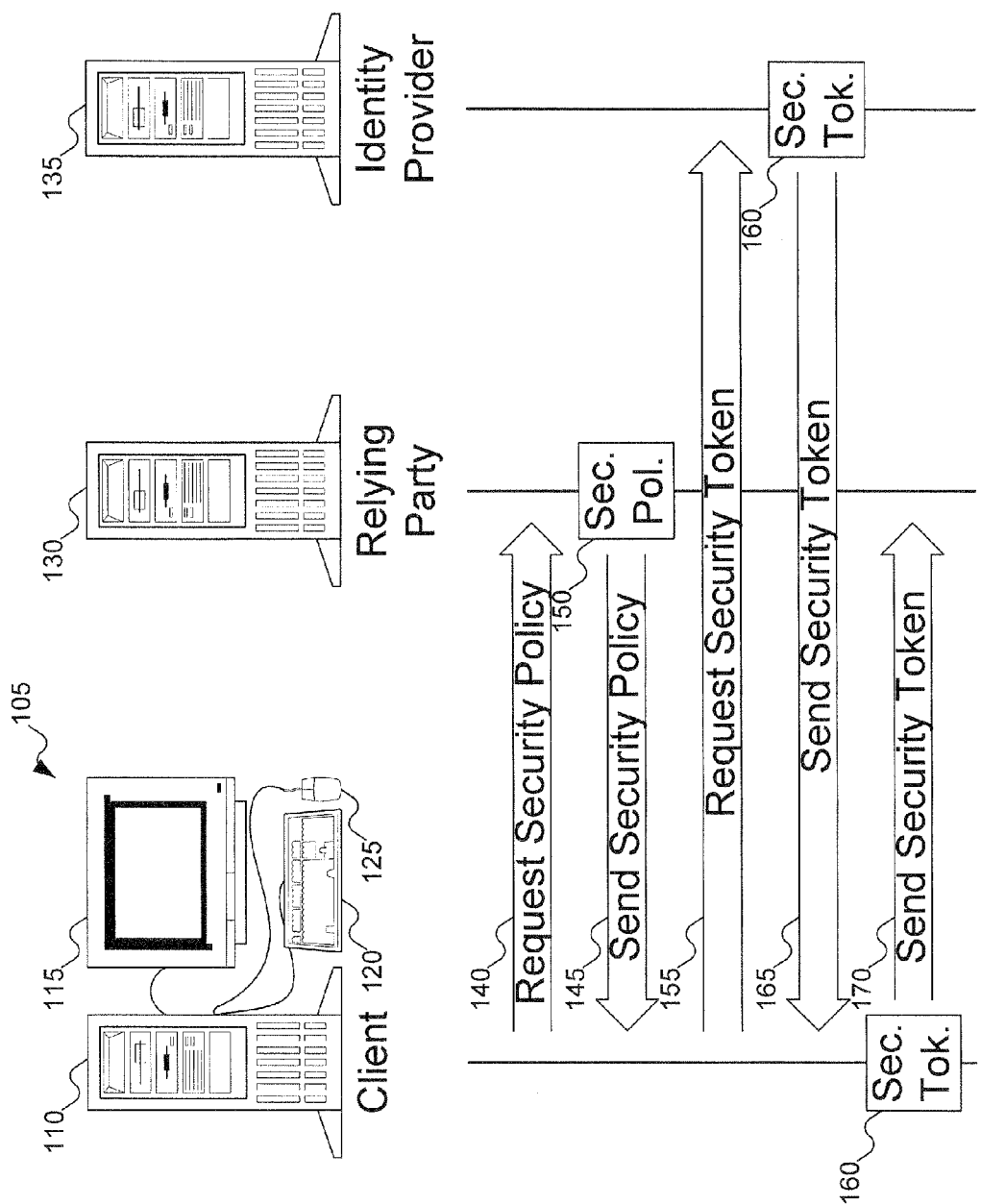
FIG. 1 shows a sequence of communications between a client, a relying party, and an identity provider.

Before explaining the invention, it is important to understand the context of the invention. FIG. 1 shows a sequence of communications between a client, a relying party, and an identity provider. For simplicity, each party (the client, the relying party, and the identity provider) may be referred to by their machines. Actions attributed to each party are taken by that party's machine, except where the context indicates the actions are taken by the actual party.

In FIG. 1, computer system 105, the client, is shown as including computer 110, monitor 115, keyboard 120, and mouse 125. A person skilled in the art will recognize that other components can be included with computer system 105: for example, other input/output devices, such as a printer. In addition, FIG. 1 does not show some of the conventional internal components of computer system 105; for example, a central processing unit, memory, storage, etc. Although not shown in FIG. 1, a person skilled in the art will recognize that computer system 105 can interact with other computer systems, such as relying party 130 and identity provider 135, either directly or over a network (not shown) of any type. Finally, although FIG. 1 shows computer system 105 as a conventional desktop computer, a person skilled in the art will recognize that computer system 105 can be any type of machine or computing device capable of providing the services attributed herein to computer system 105, including, for example, a laptop computer, a personal digital assistant (PDA), or a cellular telephone.

Relying party 130 is a machine managed by a party that relies in some way on the identity of the user of computer system 105. The operator of relying party 130 can be any type of relying party. For example, the operator of relying party 130 can be a merchant running a business on a website. Or, the operator of relying party 130 can be an entity that offers assistance on some matter to registered parties. Relying party 130 is so named because it relies on establishing some identifying information about the user.

Identity provider 135, on the other hand, is managed by a party responsible for providing identity information (or other such information) about the user for consumption by the relying party. Depending on the type of information identity provider 135 stores for a user, a single user might store identifying information with a number of different identity providers 135, any of which might be able to satisfy the request of the relying party. For example, identity provider 135 might be a governmental agency, responsible for storing information generated by the government, such as a driver's license number or a social security number. Or, identity provider 135 might be a third party that is in the business of managing identity information on behalf of users.

The conventional methodology of releasing identity information can be found in a number of sources. One such source is Microsoft Corporation, which has published a document entitled Introducing Windows CardSpace, which can be found on the World Wide Web and is hereby incorporated by reference. To summarize the operation of Windows CardSpace, when a user wants to access some data from relying party 130, computer system 105 requests the security policy of relying party 130, as shown in communication 140, which is returned in communication 145 as security policy 150. Security policy 150 is a summary of the information relying party 130 needs, how the information should be formatted, and so on.

Once computer system 105 has security policy 150, computer system 105 can identify which information cards will satisfy security policy 150. Different security policies might result in different information cards being usable. For example, if relying party 130 simply needs a username and password combination, the information cards that will satisfy this security policy will be different from the information cards that satisfy a security policy requesting the user's full name, mailing address, and social security number. The user can then select an information card that satisfies security policy 150.

Once the user has selected an acceptable information card, computer system 105 uses the selected information card to transmit a request for a security token from identity provider 135, as shown in communication 155. This request can identify the data to be included in the security token, the credential that identifies the user, and other data the identity provider needs to generate the security token. Identity provider 135 returns security token 160, as shown in communication 165. Security token 160 includes a number of claims, or pieces of information, that include the data the user wants to release to the relying party. Security token 160 is usually encrypted in some manner, and perhaps signed and/or time-stamped by identity provider 135, so that relying party 130 can be certain that the security token originated with identity provider 135 (as opposed to being spoofed by someone intent on defrauding relying party 130). Computer system 105 then forwards security token 160 to relying party 130, as shown in communication 170.

In addition, the selected information card can be a self-issued information card: that is, an information card issued not by an identity provider, but by computer system 105 itself. In that case, identity provider 135 effectively becomes part of computer system 105.

In this model, a person skilled in the art will recognize that because all information flows through computer system 105, the user has a measure of control over the release of the user's identity information. Relying party 130 only receives the information the user wants relying party 130 to have, and does not store that information on behalf of the user (although it would be possible for relying party 130 to store the information in security token 160: there is no effective way to prevent such an act).

The problem with this model is, as noted above, that the party managing relying party 130 is only concerned with protecting itself, and not with protecting the identity information of the user. For example, an on-line merchant might require the user to log in to the system before the user can perform an on-line purchase: once the user is logged in, then either the credit card number provided to complete the transaction will be valid, or the party that perpetrated the fraud is identified. But the on-line merchant does not worry about protecting the credit card information: if the user's identity is known, the user can be responsible for the security of the credit card information.

In addition, in an on-line transaction, there is some information that does not flow through computer system 105. Specifically, the information that flows between relying party 130 and the party that processes the transaction (e.g., the credit card processor) does not flow through computer system 105. Because this information is not considered identity information by relying party 130, such information is not processed using the same rules as the identity information.

Further, this model does not provide the user with any way to audit the use of his or her information. If a fraud is perpetrated, the user only finds out about the fraud in the standard ways: when someone comes demanding payment for a transaction the user did not approve (or, if the user is somewhat savvy, when the user checks his or her on-line transaction records).

Yet another problem with this model is that there are some types of information cards that can be used without the person using the information card having to provide any further credentials. If such a card is available to a third party, that third party might be able to use the information card when the third party should not be permitted to do so. Further, as noted above, the information card(s) used by the user need to be stored on computer system 105. If computer system 105 is a publicly available computer system, then the user might be reluctant to store information card(s) on computer system 105, because the user might be unable to remove the information card(s) or forget to do so. That the data represented by the information cards might be protected by the requirement of a credential from the user might not be enough to satisfy the security needs of the user.

Figure 2:
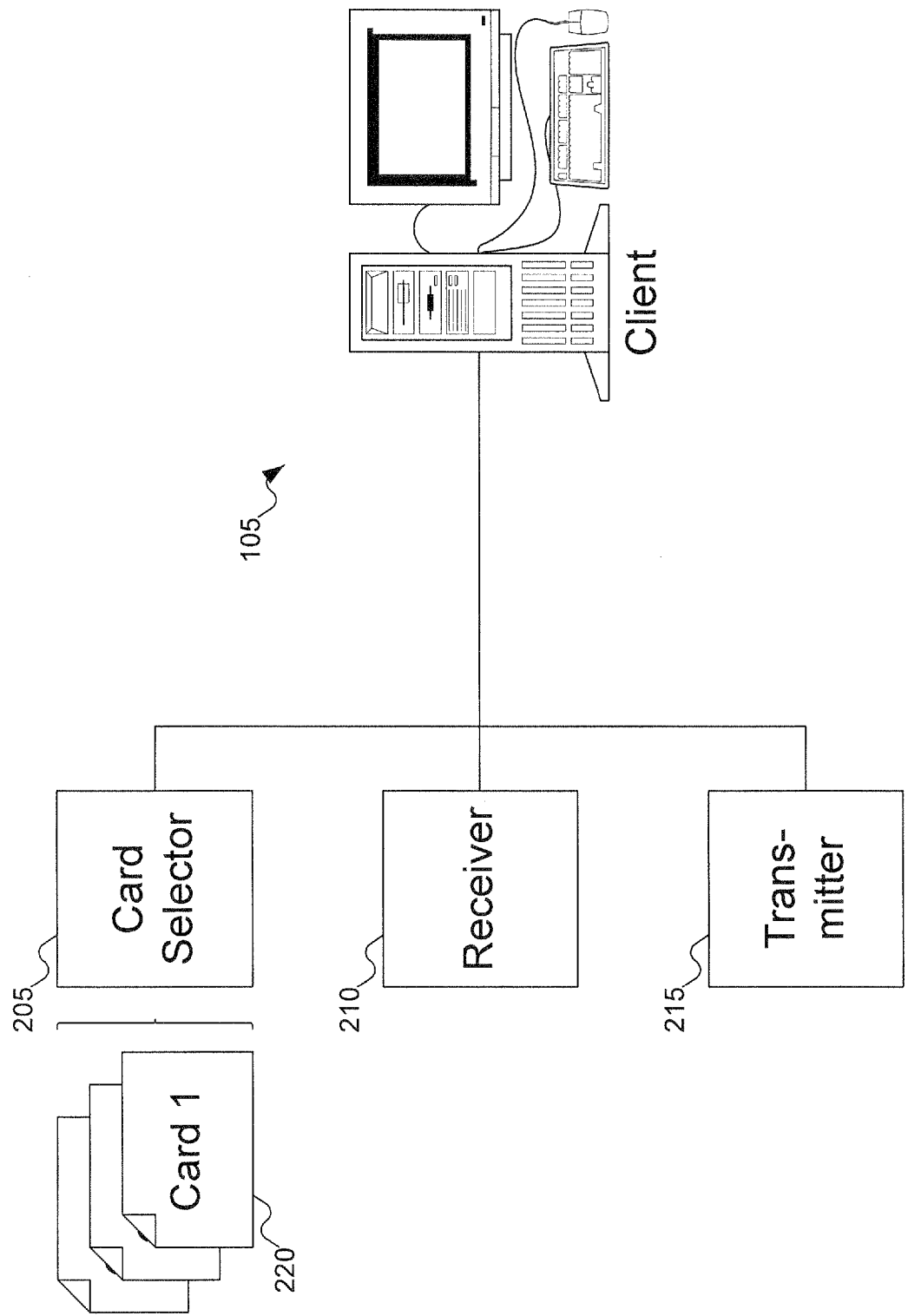
FIG. 2 shows a system to perform a business transaction without releasing sensitive information to the relying party, according to an embodiment of the invention.

Now that the problems—finding a way to protect information that is important to the user but not considered identity information by the relying party, providing the user with audit capability for his or her information, and not having to store the information cards on a computer system—are understood, solutions to the problem can be explained. FIG. 2 shows a system to perform a business transaction without releasing sensitive information to the relying party, to perform a transaction which can be audited by an identity provider, and to perform a transaction without storing information card information on computer system 105, according to embodiments of the invention. In FIG. 2, computer system 105 includes card selector 205, receiver 210, and transmitter 215. Card selector 205 is responsible for enabling a user to select information card 220 that satisfies the security policy. Receiver 210 is responsible for receiving data transmitted to computer system 105, and transmitter 215 is responsible for transmitting information from computer system 105. These components are the same as those found in computer system 105 as shown in FIG. 1. But receiver 210 and transmitter 215 are also responsible for communicating with a transaction processor, which is different from computer system 105 in FIG. 1.

Protecting Information Important to the User that is Not Identity Information

Figure 3:
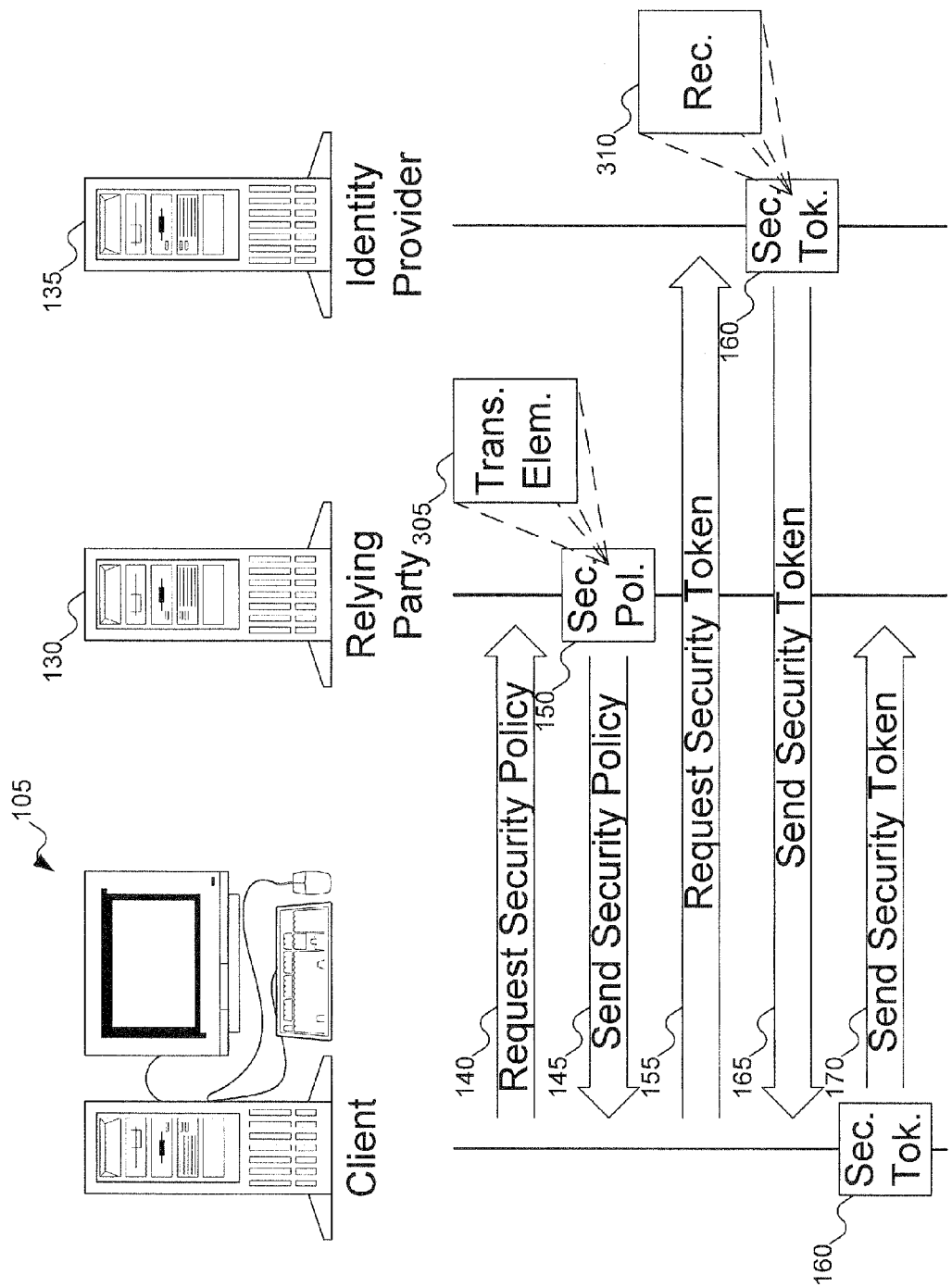
FIG. 3 shows the sequence of communications of FIG. 1 modified to support performing the business transaction without releasing sensitive information for the relying party.

FIG. 3 shows the sequence of communications of FIG. 1 modified to support performing the business transaction without releasing sensitive information for the relying party. In FIG. 3, communication 140 is the same as shown in FIG. 1: computer system 105 requests security policy 150 from relying party 130. In communication 145, relying party 130 provides security policy 150, which includes transaction elements 305. As discussed elsewhere, transaction elements 305 can include any elements of the transaction that would normally be provided by relying party 130. Examples of transaction elements 305 can include the overall cost of the transaction to the user and an identifier of relying party 130 (so that relying party 130 can be properly credited for the transaction, perhaps by deposit of the cost into a bank account of relying party 130).

Computer system 105 requests a security token from identity provider 135 in communication 155. In response, identity provider 135 sends security token 160 back to computer system 105 in communication 165. In generating security token 160, identity provider 135 processes the business transaction between the user and relying party 130. Continuing with the example of the user purchasing some items from relying party 130, identity provider 135 can be a bank or other financial transaction processor, such as a credit card company. As a financial transaction processor, identity provider 135 can deduct an account of the user by the cost of the transaction, and credit an account of relying party 130 by that amount. Identity provider 135 can then generate a transaction receipt, such as receipt 310, which can be included in security token 160. In fact, if all relying party 130 requests is a transaction receipt, then security token 160 might be nothing more than receipt 310. Finally, computer system 105 can send security token 160 to relying party 130 in communication 170.

Often, transaction elements 305 provided by relying party 130 will not be enough to enable identity provider 135 to process the transaction. For example, relying party 130 is unlikely to know any accounts of the user which could be used in processing the transaction by identity provider 135. But relying party 130 does not need to know which account of the user to use: relying party 130 only needs the transaction receipt. Thus, computer system 105, recognizing that a financial transaction is to occur, can present to the user a list of information cards that identify accounts the user might use in completing the financial transaction. The user can then select the appropriate information card to be used; the account information identified by this information card can provide enough information to identity provider 135 to permit identity provider 135 to process the transaction.

It might happen that relying party 130, in providing security policy 150, asks for more than just a transaction receipt. For example, relying party 130 might want to know something about the user. Recall that an older way to perform a transaction involves the user logging in to the web site of the service provider, then inputting to the web site enough information to permit the transaction to be completed (such as credit card information). Thus, relying party 130 in FIG. 3 might want to know which user performed the transaction: for example, to be able to ship purchased items to the user. This possibility introduces new wrinkles into the operation of the claimed invention.

In one embodiment, the user can have an information card that can satisfy the needs of all parties: the information card identifies enough information to permit identity provider 135 to process the transaction and generate receipt 310, and to provide the other information relying party 130 has requested. This is a straightforward solution to providing all the information relying party 130 wants. The user can also, if he or she is not comfortable providing all the information relying party 130 wants, choose to not do business with relying party 130, instead opting for a competitor of relying party 130 that does not request as much information.

In another embodiment, the user might not have a single information card that can be used to satisfy all parties' needs. For example, the user might have one information card that includes the financial information identity provider 135 needs to process the transaction, and another identity card that can satisfy the other requests of relying party 130. If a single identity provider 135 is capable of performing all the described processes, then the user can create a single information card that can be used both to process the transaction (to generate receipt 310) and to identify the other information to be provided to relying party 130.

If the user does not have an information card associated with a single identity provider 135 is not capable of providing all of the information requested by relying party 130 in security policy 150, then the solution is more difficult. For example, the user's bank might be willing to store banking information for the user, thus making the bank an identity provider capable of processing a financial transaction. But the user's bank might not want to store other information about the user. To address this problem, in one embodiment the user can attempt to locate a single identity provider 135 that can satisfy all of the requests of relying party 130. If the user can find a single identity provider that can provide all of the information relying party 130 wants, then the user can establish an identity card with that identity provider, and a security token that is responsive to all of the requests of relying party can be generated. (The user, as discussed above, can also choose to refuse to do business with relying party 130 in this situation.)

In another embodiment, computer system 105 parses security policy 150 into different portions, which can be processed separately. For example, computer system 105 can separate the financial transaction portion of security policy 150 from the other requested information. The user can then select one information card to process the transaction, and a second information card to handle the request for other information. Each information card can be handled by a different identity provider: for example, the user's bank might handle the financial transaction, with a state-operated identity provider providing the other requested information. In this situation, computer system 105 might return two security tokens to relying party 130.

Security policy 150 from relying party 130 can impose limitations on how receipt 310 is generated. For example, an on-line merchant might choose to only accept payment via PayPal®, and not via a credit card. (PayPal is a registered trademark of PayPal, Inc. in the United States.) The on-line merchant can then specify that payment is to be made using a PayPal account, and the card selector would eliminate from consideration any information cards that do not offer payment via PayPal. A person skilled in the art will recognize other ways in which security policy 150 can limit the generation of receipt 310.

If the additional elements are stored in an information card, access to the data in the information card might be controlled so that the user needs to provide credentials to access the data. In that case, the credentials can be managed in a manner similar to the management of credentials for other information cards.

Transaction elements 305 can be generated in any desired manner. For example, the user can load items into a shopping cart system offered by relying party 130. Or, relying party 130 can offer a pre-configured package, enabling the user to select a number of items in a single step. Relying party 130 can also store a shopping cart from a previous visit by the user, permitting the user to identify the list of desired items over a period of time, rather than all at once. Relying party 130 can also transfer a user's wish list into the shopping cart, so that the user can fill the shopping cart based on items known to be of interest to the user.

While the above discussion suggests that the information card satisfying security policy 150 is one that establishes identity, it is important to remember that the information card does not need to actually establish the user's identity. All that is required is that the selected information card satisfies security policy 150. Assuming the selected information card satisfies security policy 150, then the selected information card "identifies" the user to the satisfaction of relying party 135, even if the information in the information card does not actually identify the user. Thus, for example, if security policy 150 would be satisfied with an information card that includes a credit card number, the selected information card does not necessarily need to actually "identify" the user's person: for example, the user's name.

Figure 4:
FIG. 4 shows an information card including sensitive information used in performing a transaction with the system of FIG. 2.

FIG. 4 shows an information card including sensitive information used in performing a transaction with the system of FIG. 2. In FIG. 4, an example of information card 220 is shown in greater detail. Information card 220 is shown as including transaction information 405, which includes information such as the user's name, address, age, and banking information. In particular, information card 220 includes a bank routing number and account number 410, which enables performing a transaction using this account. In this example, information card 220 would permit a debit card transaction using a bank account, but a person skilled in the art will recognize how information card 220 could be modified to permit other types of financial transactions. For example, account number 410 could be a credit card number, identifying a credit card account (in which case, there might not be a bank routing number).

Where information card 220 is a managed information card (that is, managed by an identity provider), the information represented by information card 220 is not actually stored on the user's computer. This information is stored by the identity provider. Thus, the information displayed on information card 220 would not be the actual information stored by the identity provider, but rather an indicator of what information is included in information card 220.

Figure 5:
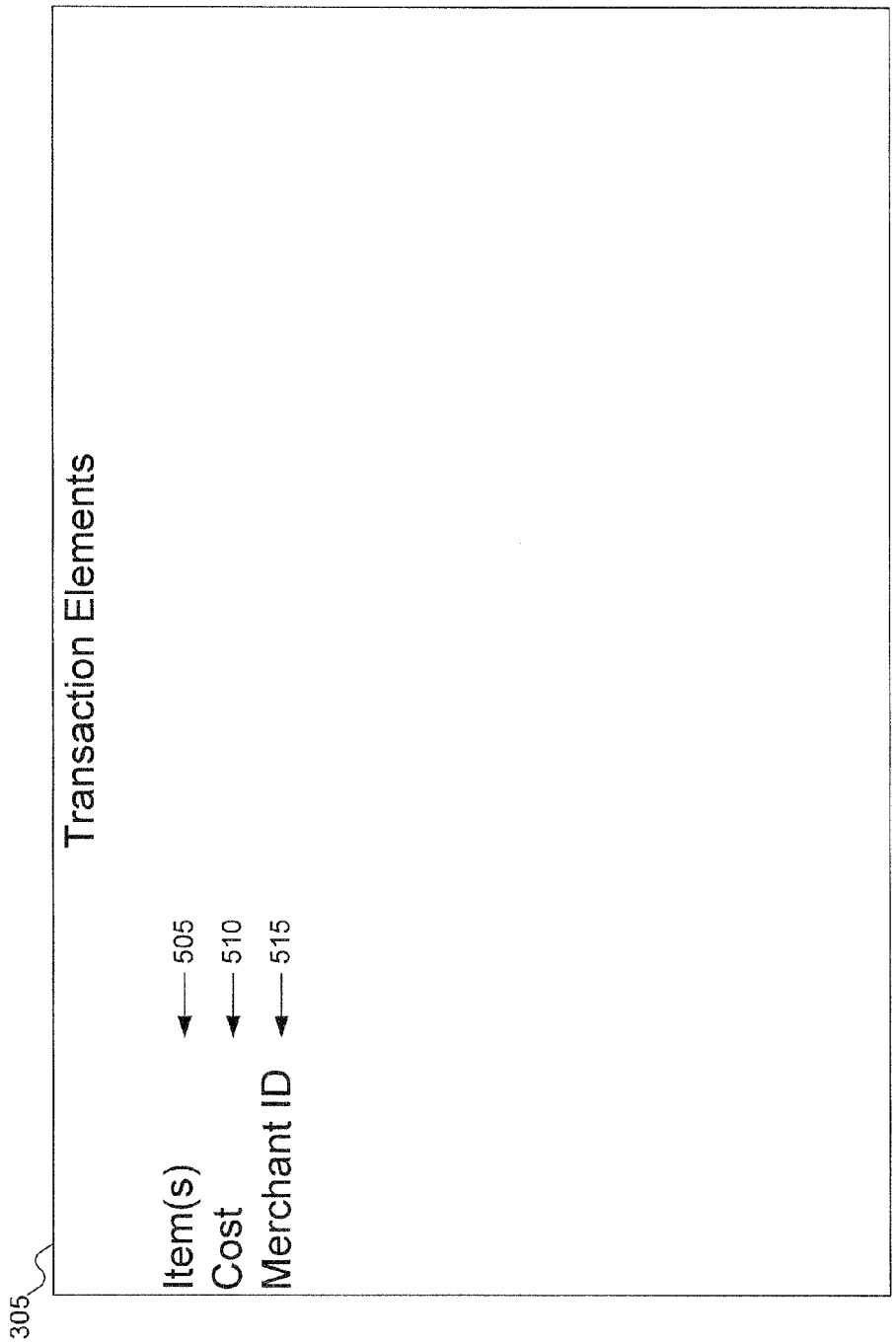
FIG. 5 shows transaction elements used in performing the transaction in the system of FIG. 2.

FIG. 5 shows transaction elements used in performing the transaction in the system of FIG. 2. In FIG. 5, an example of transaction elements 305 is shown in greater detail. In transaction elements 305, the relying party has provided a list of items 505 to be purchased, the total cost 510 of the transaction, and an ID 515 of the merchant in the transaction. To this information, the user can then add his transaction elements, such as his name, billing address, and bank account number (as shown in information card 220 of FIG. 4). The combination of transaction elements 305 and the additional elements is enough for the transaction processor to carry out the transaction and issue a transaction receipt.

Figure 6:
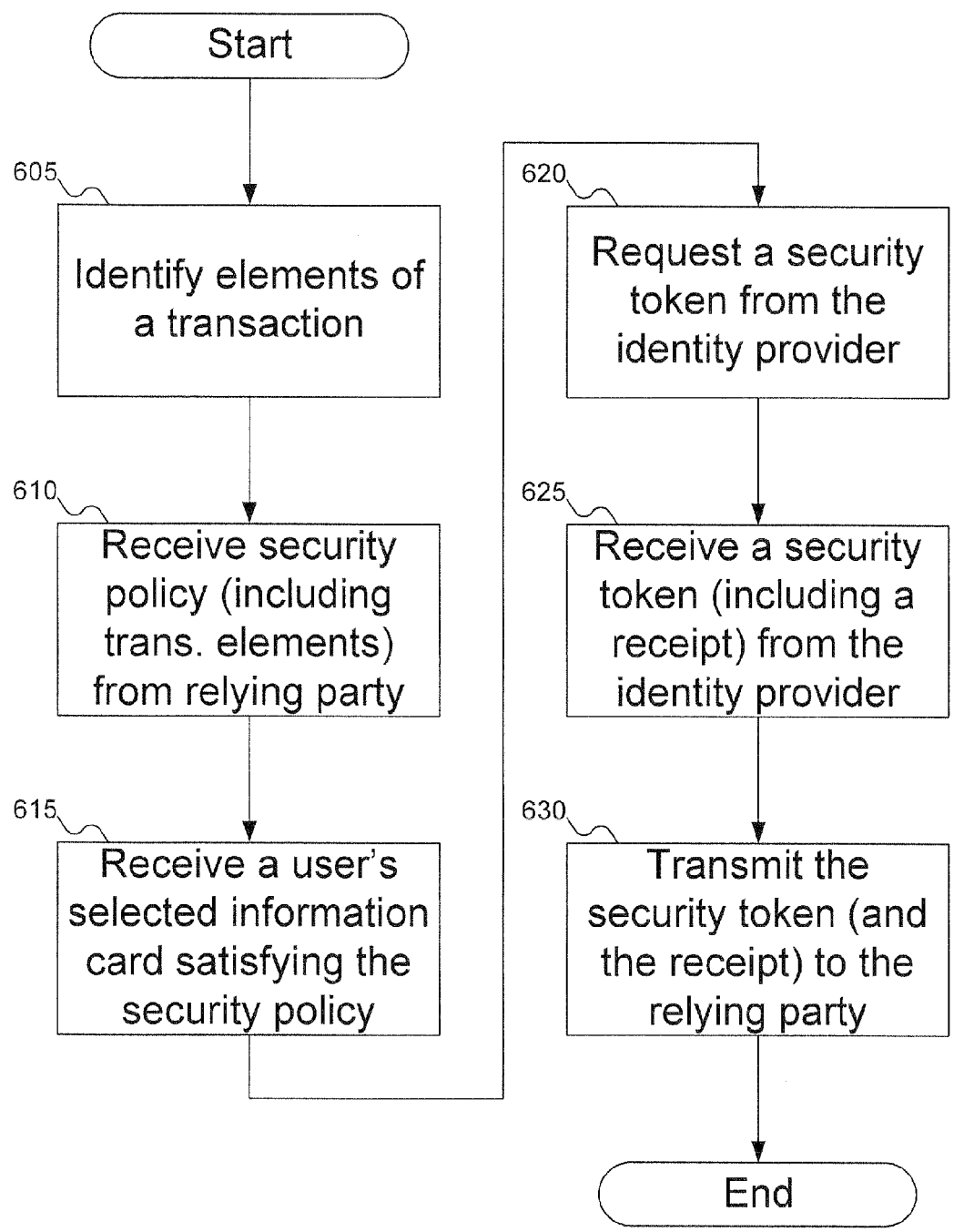
FIG. 6 shows a flowchart of a procedure to perform a transaction without disclosing sensitive information in the computer system of FIG. 2.

FIG. 6 shows a flowchart of a procedure to perform a transaction without disclosing sensitive information in the computer system of FIG. 2. In FIG. 6, at block 605, the elements of a transaction are identified. These elements are typically partly identified by the user and partly by the relying party. At block 610, the computer system receives the security policy and transaction elements from the relying party. As discussed above with reference to FIG. 3, the transaction elements are included as part of the security policy, but a person skilled in the art will recognize that the transaction elements could be sent in a communication separate from the rest of the security policy, if desired. At block 615, the user selects an information card that satisfies the security policy, which is sent to the computer system. At block 620, the computer system requests a security token from the identity provider. At block 625, the computer system receives a security token from the identity provider, which includes the receipt. Finally, at block 630, the computer system sends the security token (with the transaction receipt) to the relying party.

As discussed above with reference to FIG. 3, in some embodiments, it might occur that multiple security tokens could be coming from multiple identity providers. For example, the transaction receipt might be processed by one identity provider, and a request for other information by the relying party might be processed by another identity provider. A person skilled in the art will recognize how FIG. 6 can be modified to accommodate these alternative embodiments.

While the above discussion focuses on transactions that are generally commercial in nature, a person skilled in the art will recognize that embodiments of the invention can be used in other contexts. For example, the relying party might be offering a service that does not require a transfer of finances from the user, but still request some non-identity information from the user. In such a situation, embodiments of the invention can be used to control the release of the non-identity information in a manner that satisfies the user's security concerns.

Performing a Transaction which can be Audited by an Identity Provider

Figure 7:
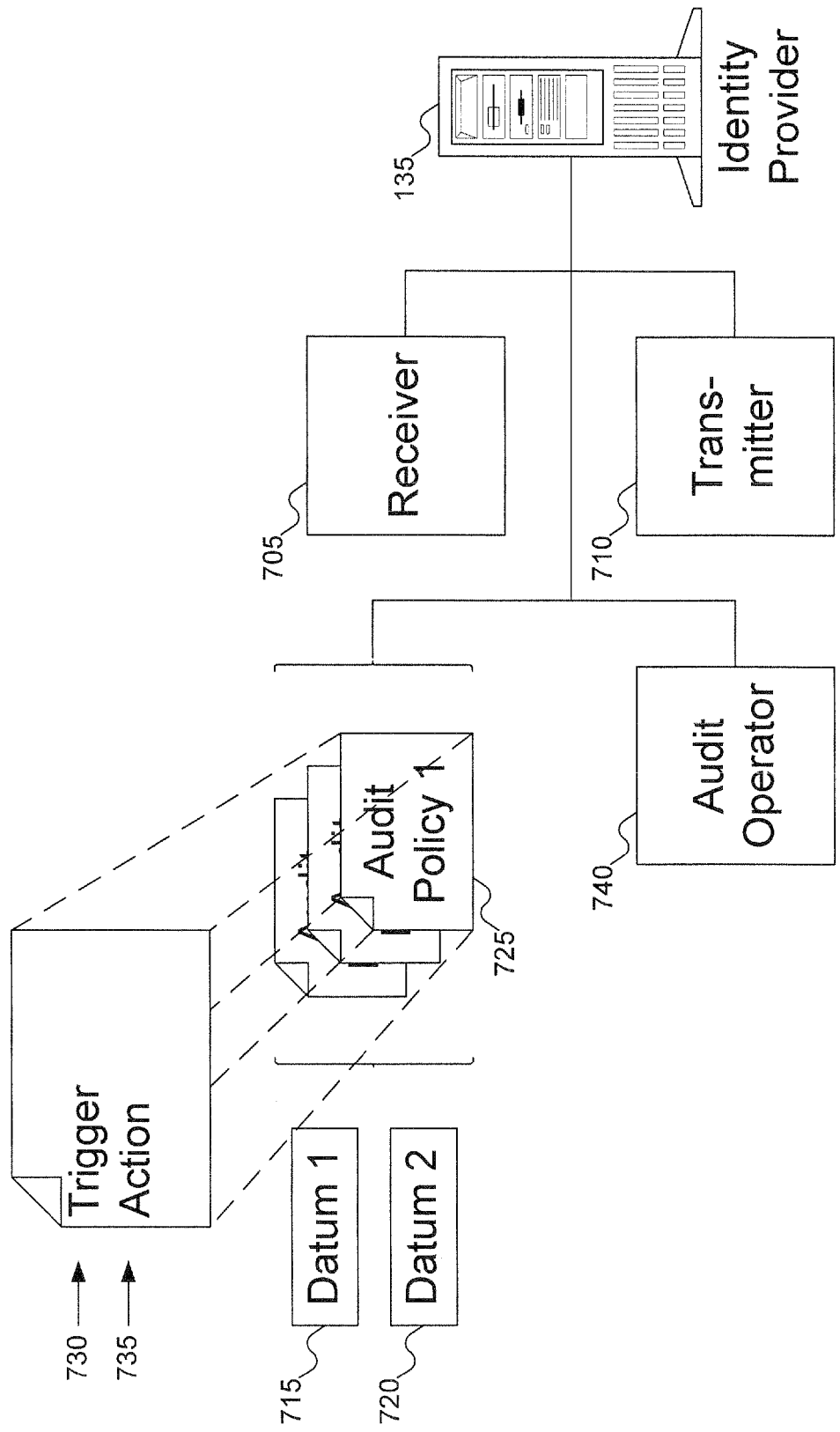
FIG. 7 shows details of the identity provider of FIG. 1 equipped to provide an audit service, according to an embodiment of the invention.

Before explaining how the computer system of FIG. 2 enables audit capability, it is helpful to understand how the audit service is implemented at the back end. FIG. 7 shows details of the identity provider of FIG. 1 equipped to provide an audit service, according to an embodiment of the invention. In FIG. 7, identity provider 135 is shown as including receiver 705 and transmitter 710. Receiver 705 and transmitter 710 are used for communicating with other machines involved in the transaction. These machines can include computer system 105 and relying party 130, shown in FIGS. 1 and 2, but a person skilled in the art will recognize that there can be other machines participating in the transaction. For example, in one embodiment, identity provider 135 can be responsible for managing the identity information, but a separate machine, termed the secure token service, can be responsible for issuing the security token to the relying party. In that situation, receiver 705 and transmitter 710 can also be used to communicate with the secure token service.

Identity provider 135 also includes various data that can be used in some form to identify users. These data, examples of which are shown individually in FIG. 7 as data 715 and 720, are the data that is represented in the information cards to the user on the client machine. Although FIG. 7 shows only two pieces of data 715 and 720, a person skilled in the art will recognize that identity provider 135 can store any number of pieces of data for any number of users. Thus, for example, identity provider 135 might store three pieces of data for one user, one piece of data for a second user, six pieces of data for a third user, and so on.

Associated with each piece of data are one or more audit policies. Further, the same audit policy can be associated with multiple pieces of data. FIG. 7 shows three audit policies associated with data 715 and 720, with detail shown about audit policy 725. A person skilled in the art will recognize that there can be any number of audit policies associated with any given datum, potentially including none (if the user has not yet configured an audit policy or is not concerned about being able to audit the information referenced by the information card). Further, a person skilled in the art will recognize that a given user with multiple pieces of data managed by identity provider 135 can have different numbers of audit policies associated with the individual data, as desired. Receiver 705 enables users to define the audit policies, including one or more triggers 730 and audit actions 735. Trigger 730 defines the event that, when it occurs, causes audit operator 740 to perform audit action 735. Further discussion about trigger 730 and audit action 735 can be found with reference to FIGS. 8-10 below.

It is also possible for identity provider 135 to store an audit policy that is not associated directly with particular data, or even associated with any data. For example, the user might establish an audit policy that requests identity provider 135 to send an e-mail message to the user any time a security token is generated, regardless of what data is included in the security token. One situation in which this is useful is where the relying party wants a security token, but does not need any particular data managed by the identity provider. Put another way, the relying party simply wants to know if the identity provider can issue a security token for the user: if the identity provider can issue a security token, it establishes that the identity provider can authenticate the user. In some situations, this can be enough information. As an example, a merchant might have a special arrangement with a local company that employees of the company are offered a discount when dealing with the merchant. If a user can authenticate to an identity provider that the merchant knows is managed by the company and that only authenticates employees of the company, the merchant can rely on a security token from the identity provider as proof that the user is actually employed by the company. Note, however, that even in this situation, there is still some "data" being transmitted, even if the security token does not carry any managed information about the user: the security token identifies the identity provider. The merchant can specify that the security token must be provided by the company's identity provider as part of the requirements for the requested security token.

In another embodiment, the user can define an audit policy that is partly based on data identity provider 135 stores, but is not directly associated with data that would be included in the security token. As an example, a car rental agency that permits customers to reserve vehicles over the Internet might want to know whether the user is 25 years old, as the agency does not want to rent vehicles to drivers under the age of 25. Or a supermarket, which sells, among other groceries, alcohol, might want to be able to verify that a customer to its web site is 21 years old, and thus legally permitted to purchase alcohol. In examples like these, the relying party is not interested a specific datum (such as the user's age) managed by the identity provider, but rather in a value that is derived from that datum. In the above examples, the relying parties are interested in knowing whether the user was born a sufficient number of years ago to meet some requirement. Note that the question being answered in these situations is not "What is the value?", but rather "Does the value meet certain criteria?": the latter question can be answered with either a "Yes" or a "No" answer. In this embodiment, where the security token transmits data that is derived from a value managed by the identity provider, the user might establish an audit policy that requests an e-mail whenever the underlying datum (e.g., the user's date of birth) is included in the security token, whenever a value derived from that datum is transmitted, or both.

In this embodiment, the relying party can identify the requested derived value in the security policy. The relying party can specify this requested derived value using a Uniform Resource Identifier (URI), which is a specific way to identify a requested datum from the identity provider. The client might not know how to process the request for the derived value itself, but as long as the identity provider can process the request (by recognizing the URI, which can be stored in the information card), the proper security token can be generated.

One type of derived value that can be the basis of an audit action is a receipt for a transaction. As discussed above in the section titled "Protecting information important to the user that is not identity information", some relying parties can request a receipt for a transaction, such as a financial transaction, as part of the security token. The user can specify an audit action, such as an e-mail communication, be performed when such a receipt is generated.

In yet another embodiment, the trigger for an audit can be the identity of the relying party or the identity provider being used. For example, a user might be interested in having an audit performed whenever a transaction involving a particular merchant occurs where the security token is generated based on the user's authentication.

Returning briefly now to FIG. 2, it will be understood that receiver 210 and transmitter 215 are used not only to transmit a request for security token 160 and receive security token 160 in response. In addition, receiver 210 and transmitter 215 can be used to transmit audit policy 725 to identity provider 135 and to receive communications that audit policy 725 has been triggered (assuming audit policy 725 instructs the identity provider to transmit a message to client 105: if audit policy 725 instructs the identity provider to perform some other actions as a result of audit policy 725 being triggered, client 105 might not receive a communication from the identity provider).

Figure 8:
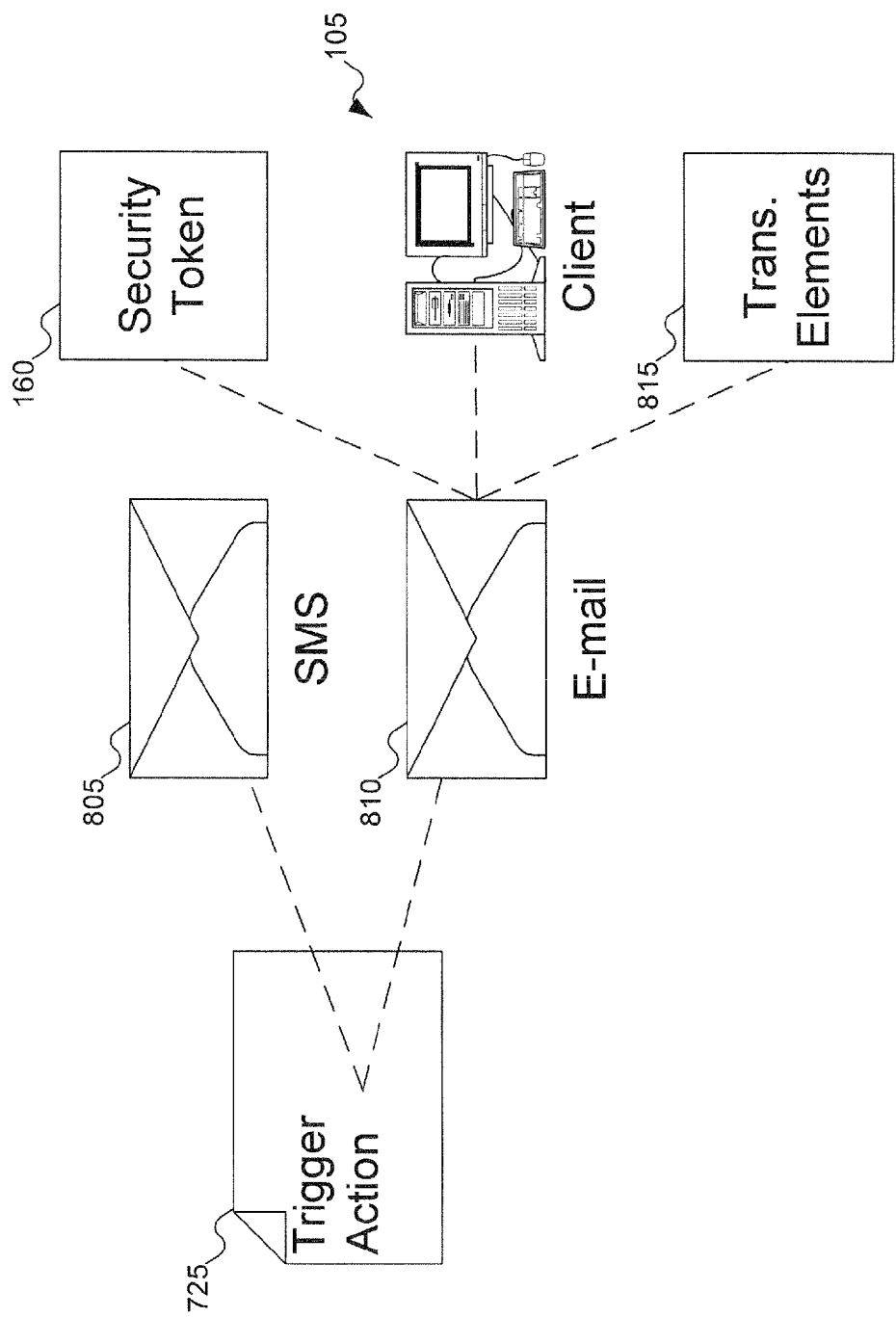
FIG. 8 shows examples of the types of audit actions that can be performed by the audit service of FIG. 7.

FIG. 8 shows examples of the types of audit actions that can be performed by the audit service of FIG. 7. In FIG. 8, examples of four different types of audit actions are shown. Message 805 is a short message service (SMS) message, which can be transmitted to, for example, a cellular telephone. Message 810 is an example of a message that can be transmitted to the user: for example, an automated e-mail message. Message 810 can be any type of message: an e-mail, a log entry, etc. Message 810 can be transmitted to client 105, or to any other machine as specified by the user. For example, message 810 can be an audit message transmitted to the user's account on a multi-user server (for example, an SMTP mail server) or to a special-purpose logging server. Message 810 can optionally include information beyond the fact that the audit policy was triggered: for example, details about security token 160 to be issued in response to the security policy, an identifier of client 105 that requested security token 160, an identifier of relying party 130, or elements of the transaction 815, among other possibilities. (A person skilled in the art will recognize that, depending on the available space in the message, such additional information can also be included in SMS message 805, despite the fact that SMS message 805 is not shown as including any such elements.) Whether transaction elements 815 can be appended to message 810 depends on whether or not identity provider 135 has access to this information. In the normal course of operation, identity provider 135 only receives the request to generate security token 160. But the system can be modified to have the relying party provide transaction elements 815 to identity provider 135, which would permit identity provider 135 to provide this information to the user (if specified in the audit policy). More information about transaction elements 815 is discussed below with reference to FIG. 11.

A person skilled in the art will recognize that embodiments of the invention can be extended to other forms of contact with the user. For example, the user could provide a telephone number (such as a cellular telephone number). Upon the triggering of an audit policy, the audit service can call the cellular telephone number and inform the user of the information being disclosed. This can be done using an automated recording, with the information being disclosed vocalized (or some approximation thereof) by the system. Alternatively, there can be a manned station to which the audit service is transferred: a person can then take the call (which can be automatically dialed for the convenience of the audit service employee, or the employee can manually dial the telephone number) and provide a real person for the user to speak with upon receiving the audit action. Another way in which audit services can be provided is by logging transactions somewhere (for example, in a database), which the user can access at a later time. Yet another possibility would be to transmit an RSS feed of the audited transaction to the user.

FIG. 9 shows how audit actions can be transmitted to the user in the audit service of FIG. 7. In FIG. 9, SMS message 805 is shown as being sent to cellular telephone 905. Message 810 is shown as being sent to computer system 105 (the client machine that has requested the security token for the transaction). Alternatively, message 810 can be sent to another machine, such as machine 910. Sending message 810 to another machine can be useful in situations where the computer system 105 (the client) is being used by a party masquerading as the user. If the message is sent to the machine being used by the defrauding party, the party would obviously confirm the fraud. But if the message is sent to another machine, such as the user's e-mail account, the user would be able to receive the message and become aware of the potential fraud.

Figure 10A:
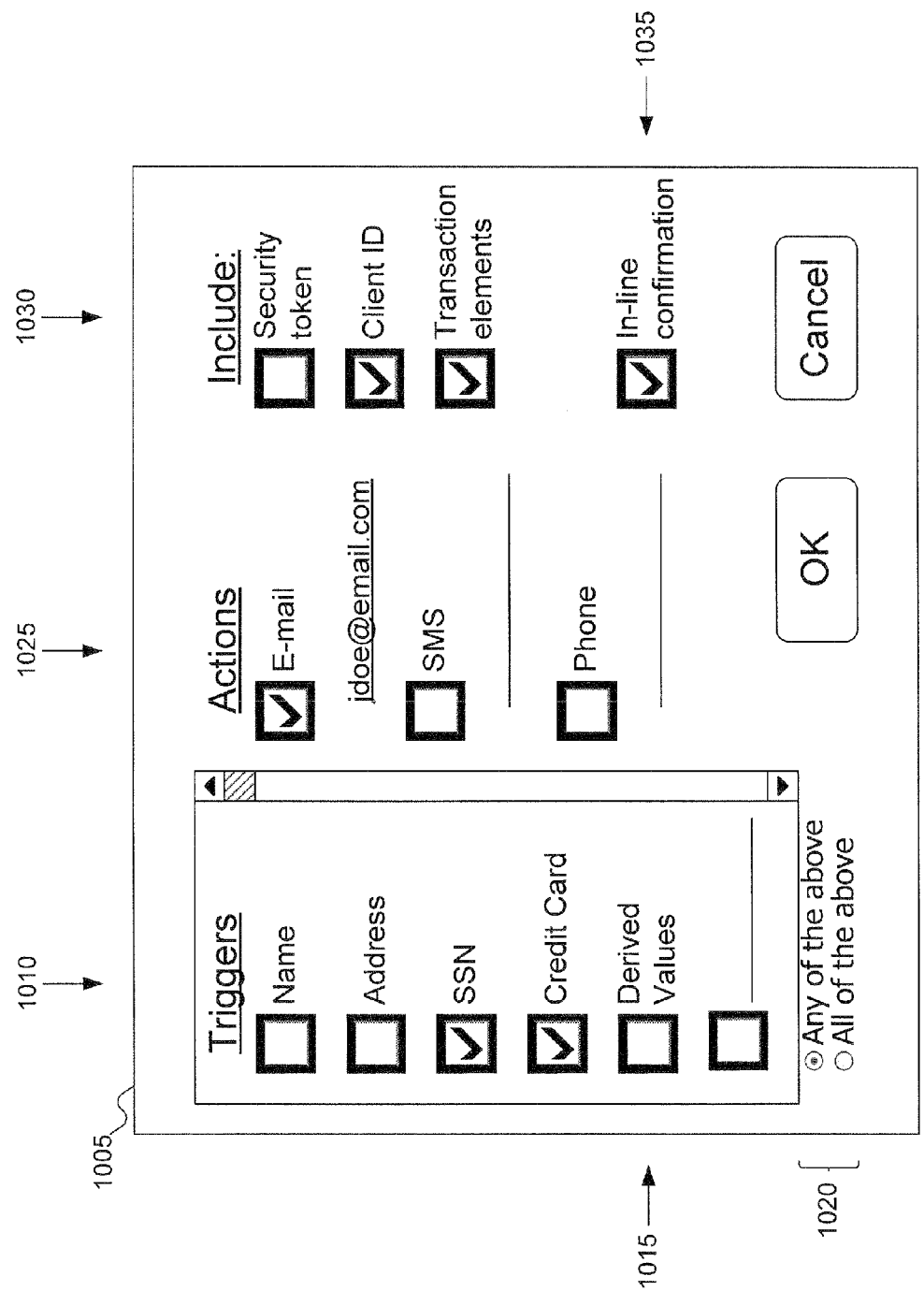
FIGS. 10A-10B show details of screens enabling a user to configure audit policies in the audit service of FIG. 7.
Figure 10B:
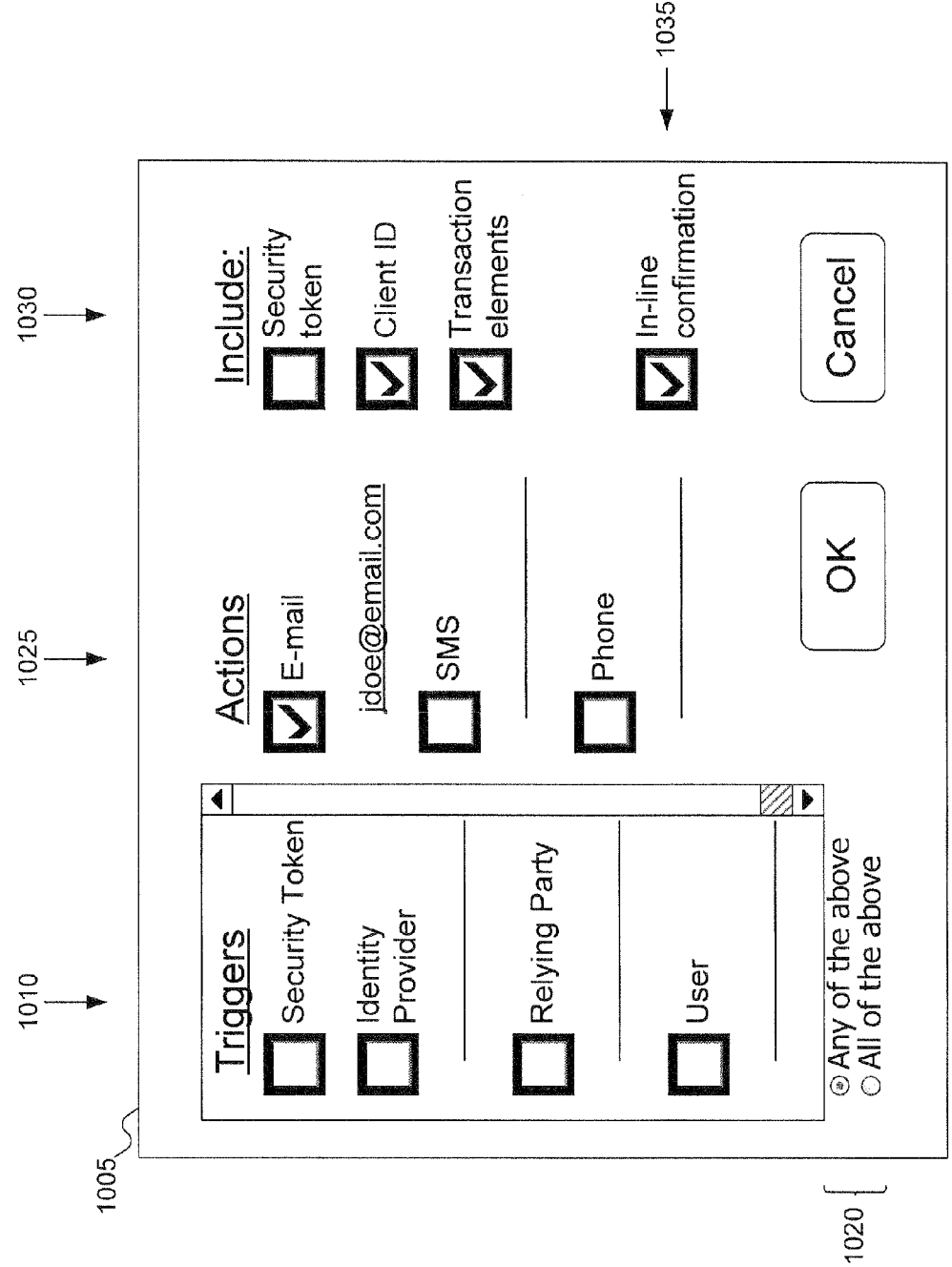

FIGS. 10A-10B show examples of screen enabling a user to configure audit policies in the audit service of FIG. 7. In FIG. 10A, screenshot 1005 is shown, offering the user a set of choices. The choices in triggers 1010 identify some possible triggers for the audit policy. For example, in screenshot 1005, the user has indicated what the triggers for the associated information card (not identified in FIG. 10A) would be if the security token includes the user's social security number or credit card number, but not if the security token includes the user's name or address. Triggers 1010 can be populated automatically, based on the information stored in the information card, or can include generic identifiers that can then apply to any data that meets that definition. For example, if the associated information card includes information about more than one credit card, the selected triggers would apply if any credit card number would be included in the security token. Further, as discussed above with reference to FIG. 7, triggers can include the generation of the security token, without any reliance on particular data managed by the identity provider, values derived from data managed by the identity provider (for example, whether the user is old enough to drive a vehicle or purchase alcohol), or the identity of the identity provider or the relying party. For example, option 1015 enables a user to opt for a trigger being a value derived from a datum managed by the identity provider.

FIG. 10B shows some additional triggers that can be used in audits. In FIG. 10B, triggers 1010 include options for the release of a security token, the use of a particular identity provider, whether the security token is being transmitted to a particular relying party, or if a particular user is responsible for the request of the security token. A person skilled in the art will recognize that the triggers shown in FIGS. 10A-10B do not represent all of the available triggers, and that there can be any other desired triggers, including all triggers described in this document. Other types of triggers (not checked or shown in FIGS. 10A-10B) can include the release of information such as name, address, telephone number, instant messaging ID, SMS address, client IP address, and so on.

A person skilled in the art will also recognize that while triggers are generally defined based on the release of particular types of data, triggers can be broader in scope than just the release of data. For example, even if the security token does not include a particular datum, if the datum is implicated in some way, that implication can be a trigger. For example, if the identity provider is capable of processing a transaction using a user's credit card directly (so that the credit card number would not need to be transmitted in the security token), the charge to the credit card might trigger an audit policy, even though no information included in the security token would have by itself triggered the audit policy.

Radio buttons 1020 provide the user with the ability to decide whether the triggers apply together or separately. In screenshot 1005, the user has opted to have the audit occur if any of the triggers independently occur. A person skilled in the art will recognize that more complicated arrangements can be made, providing the user with the ability to group triggers in various ways. Grouped triggers would permit the user to apply different audit actions under different conditions. A person skilled in the art will also recognize that a similar result can be obtained with multiple different audit policies applying to the same information card.

Audit actions 1025 specify the result the user wants taken when the trigger condition occurs. In screenshot 1005, the user has specified only one audit action to be performed: that an e-mail be sent to the user's e-mail address (jdoe@email.com). The user could also have selected to have an SMS message sent to a cellular telephone address, or have a voice announcement sent to a telephone, among other possibilities. As with triggers 1010, the possibilities in audit actions 1025 can be generated based on the associated information card, or they can be generic audit actions.

Inclusions 1030 identify optional information that can be included in the message to the user. In screenshot 1005, the user has opted to have the ID of the client requesting the security token and the details of the transaction included in the message. The user could optionally have also included information about the security token. As with triggers 1010 and audit actions 1025, the possibilities in inclusions 1030 can be generated based on the associated information card, or they can be generic inclusion options.

In-line confirmation option 1035 permits the user to specify whether confirmation of the audit needs to be received before the transaction is concluded. For example, when the user specifies in-line confirmation of the audit, the system needs to perform the selected audit actions and receive the user's confirmation of the audit before transmitting the security token to the relying party. The use of in-line confirmation permits the user to block the transaction before the transaction is completed.

In other embodiments, information cards or identities can be shared. A "shared" information card or identity means just what it suggests: that a single information card or identity card can be shared by a number of different people. It is worth understanding the difference between the concepts of a shared information card and a shared identity. A shared information card is a single information card, which might be managed by an identity provider or self-issued, but which represents data that can be used by two or more different users.

As an example of how this might occur, consider a family. The parents might establish a managed information card that stores a credit card number. The parents might want to permit their children to be able to make purchases on-line using the credit card (although the parents would probably not want to permit unlimited purchases, and so might use in-line audits to establish a measure of control over their children's use of the credit card number). The information card with the credit card number can be shared, so that any member of the family (that is, any of the family that can authenticate themselves to the identity provider) can use the data represented by that information card.

In contrast, a shared identity is where two or more different users are considered to have the same identity. This situation can occur when a business or other group of persons all want to be able to be able to use information cards associated with the identity, but the persons all want to be treated as though they were the same individual once they were authenticated. For example, consider a business that a number of employees, all authorized to make purchases for the business. The business can issue each of the employees separate business credit cards, but that would require managing a number of different credit card accounts. Instead, the business can set up a single credit card, store the credit card number in an information card, and arrange that any employee who authenticates himself or herself to the identity provider is to be treated as if he or she represented "the business", without the employee having a separate identity. Any such employee could then charge purchases to the single credit card number, without each employee needing separate credit cards. Of course, in this model, the information card is still "shared" in a technical sense, but as far as the information card is used, all of its uses are confined to a single identity; it just happens to be that the single identity can be used by any number of different individuals.

One way in which shared identities can be used to provide differing levels of access to information cards is to define roles. A "role" identifies a capability assigned to a particular type of person. For example, types of generic business roles might include "assistant", "management", and "officer". Each role might have different limits on what they can do. Continuing the example, an assistant might be permitted to use the shared business identity to make purchases up to $50 (for office supplies), a manager might be permitted to make purchases up to $500 (for purchases that are necessary for the manager's job, but within limits), and an officer might be permitted to make purchases up to $50000 (for large-scale purchases that affect the business's operation as a whole, based on delegation of authority from the board of directors).

Another variation of the shared information card or shared identity model is delegated authorization. Returning to the family example, one of the parents might create an information card storing the credit card number, and rather than sharing the information card directly with the spouse, the spouse can be delegated authority to use the information card. Delegation is similar to sharing the information card, but leaves full control over the information card in the hands of a single individual.

In these embodiments, where information cards are shared or delegated, or identities are shared, other triggers can be used. For example, triggers can include the actual identity of the user using the information card (as opposed to the identity associated with the business card, in the case of a shared identity). Triggers can be associated with roles, so that when a person exceeds the capabilities assigned to their role, an audit can be performed. A person skilled in the art will recognize other ways in which triggers can be based on data other than the contents of the security token.

In addition to one person being able to audit a transaction of another person, it is also possible to generalize the operation of the system in the other direction. One person can indicate that a third party is delegated responsibility (partial or whole) for the audit of the transaction. For example, two parties might each share an information card, but both parties could specify that only one of the two people is responsible for receiving the audit information. Or, one party can decide that they want to delegate responsibility for receiving audit information about their transactions to another party. These scenarios can be achieved in screenshot 1005 by having the delegating user include the delegate's information in section for audit actions 1025. For example, screenshot 1005 might be the audit policy for Mary Doe, who has specified in her audit policy that John Doe is to receive the audit e-mail and authorize in-line the transaction.

Figure 11:
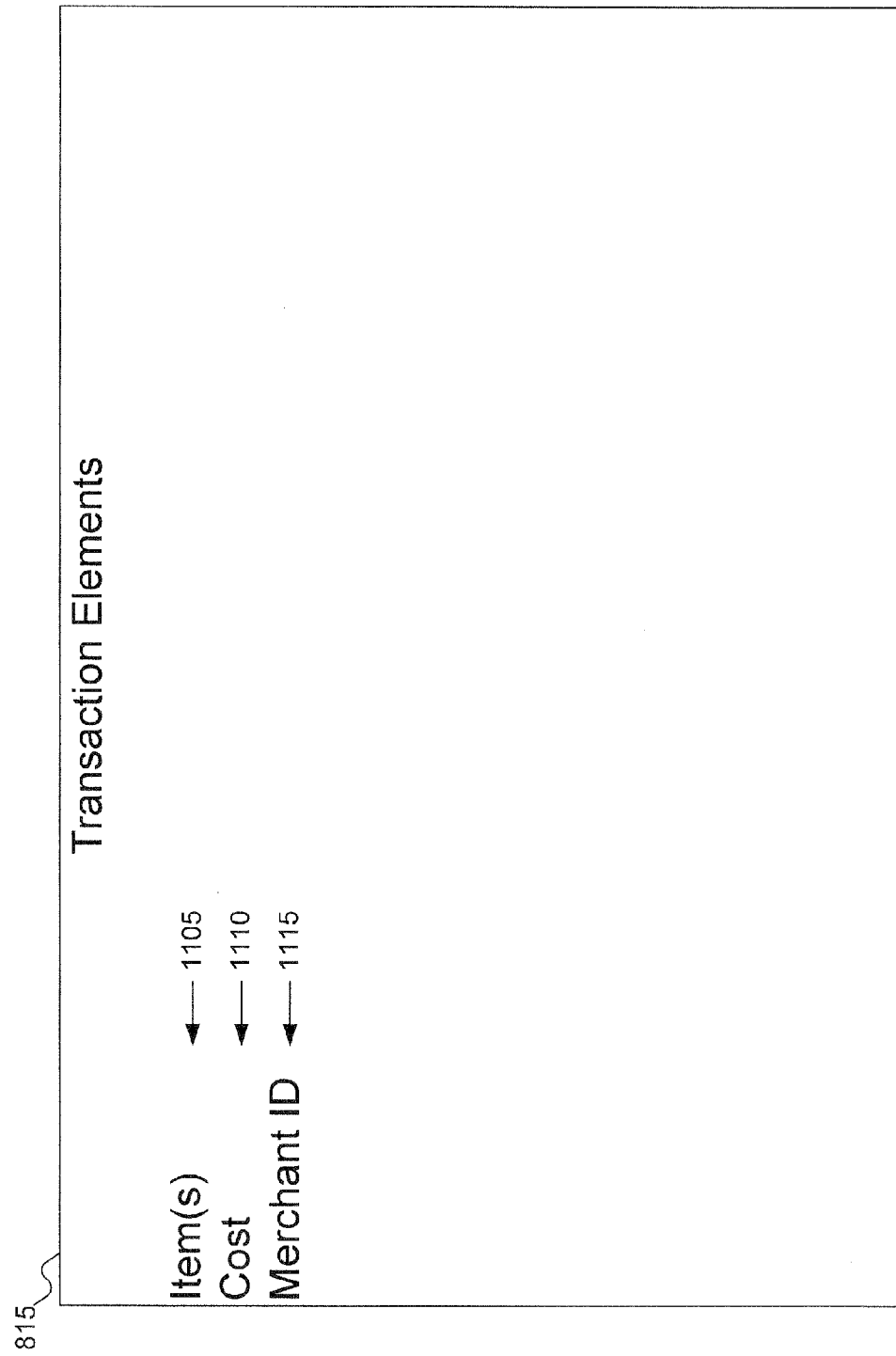
FIG. 11 shows details of transaction elements used in performing the transaction in the audit service of FIG. 7.

FIG. 11 shows details of transaction elements used in performing the transaction in the audit service of FIG. 7. In FIG. 11, details of transaction elements 815 are shown. Transaction elements 815 can include item(s) 1105 being purchased, total cost 1110 of the transaction, and merchant ID 1115, among other possibilities. In theory, any data pertinent to the transaction can be included in transaction elements 815. Provided that such information is received by the identity provider, the identity provider can include the information in transaction elements 815 for provision to the user.

Figure 12:
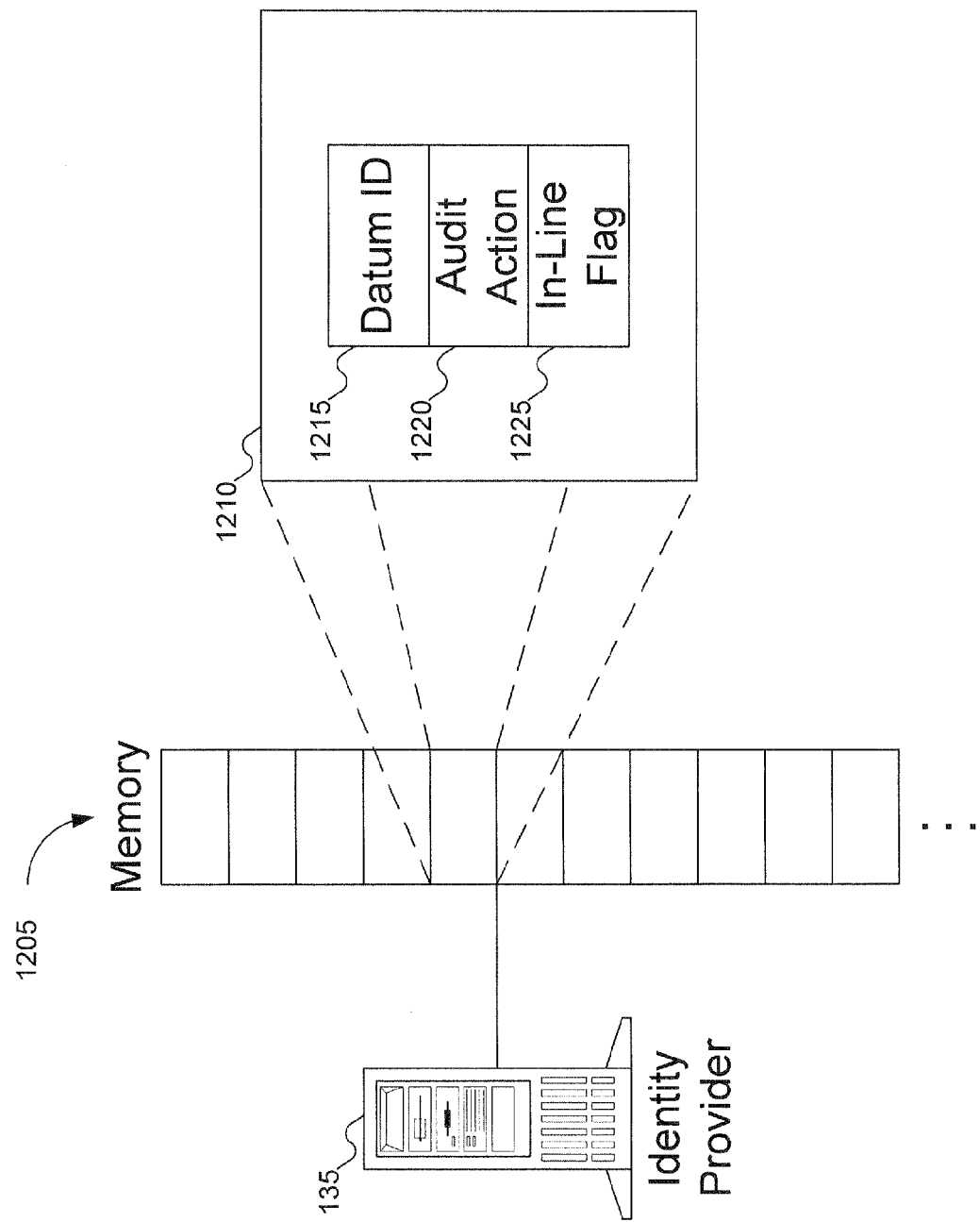
FIG. 12 shows details of the memory of the identity provider of FIG. 7, storing a data structure to manage an audit service.

FIG. 12 shows details of the memory of the identity provider of FIG. 7, storing a data structure to manage an audit service. As discussed above with reference to FIGS. 7-9, identity provider 135 can manage the audit service. To accomplish such audit management, identity provider 135 can store the audit policy information in a data structure in memory. The memory can be a volatile memory, such as a random access memory (RAM), or it can be a non-volatile memory, such as flash memory, a hard drive, or some other memory structure. In FIG. 12, memory 1205 is suggested to be RAM, but a person skilled in the art will recognize how embodiments of the invention can be implemented using memories other than RAM.

In certain locations of memory, data structure 1210 can be stored. Data structure 1210 stores datum ID 1215, audit action 1220, and in-line flag 1225. Datum ID 1215 identifies the datum that, when requested to be included in the security token, triggers the performance of audit action 1220. Although datum ID 1215 uses single tense terminology, a person skilled in the art will recognize that datum ID 1215 can identify multiple data that can trigger audit action 1220 when all are included in the security token or when included individually, to accommodate the user's preferences, as discussed above with reference to FIGS. 10A-10B. Similarly, if the audit does not depend on a particular datum being included in the security token, datum ID 1215 can be omitted. A person skilled in the art will recognize that if the associated datum includes an identifier of this audit policy, datum ID 1215 is not needed. A person skilled in the art will further recognize that the associations between pieces of data and audit policies can be stored separately from both the data and the audit policies: perhaps in a separate table stores somewhere in the memory of identity provider 135.

Audit action 1220 can be any desired audit action, whether an SMS message or an e-mail (potentially including additional information), a telephone call (automated or manual), or any other desired audit action. Finally, in-line flag 1225 specifies whether the audit is to be approved by the user before the security token is released. If in-line flag 1225 does not indicate that the audit is to be performed in-line, then the security token can be transmitted back to the client (and thence to the relying party) before audit action 1220 is performed.

Figure 13:
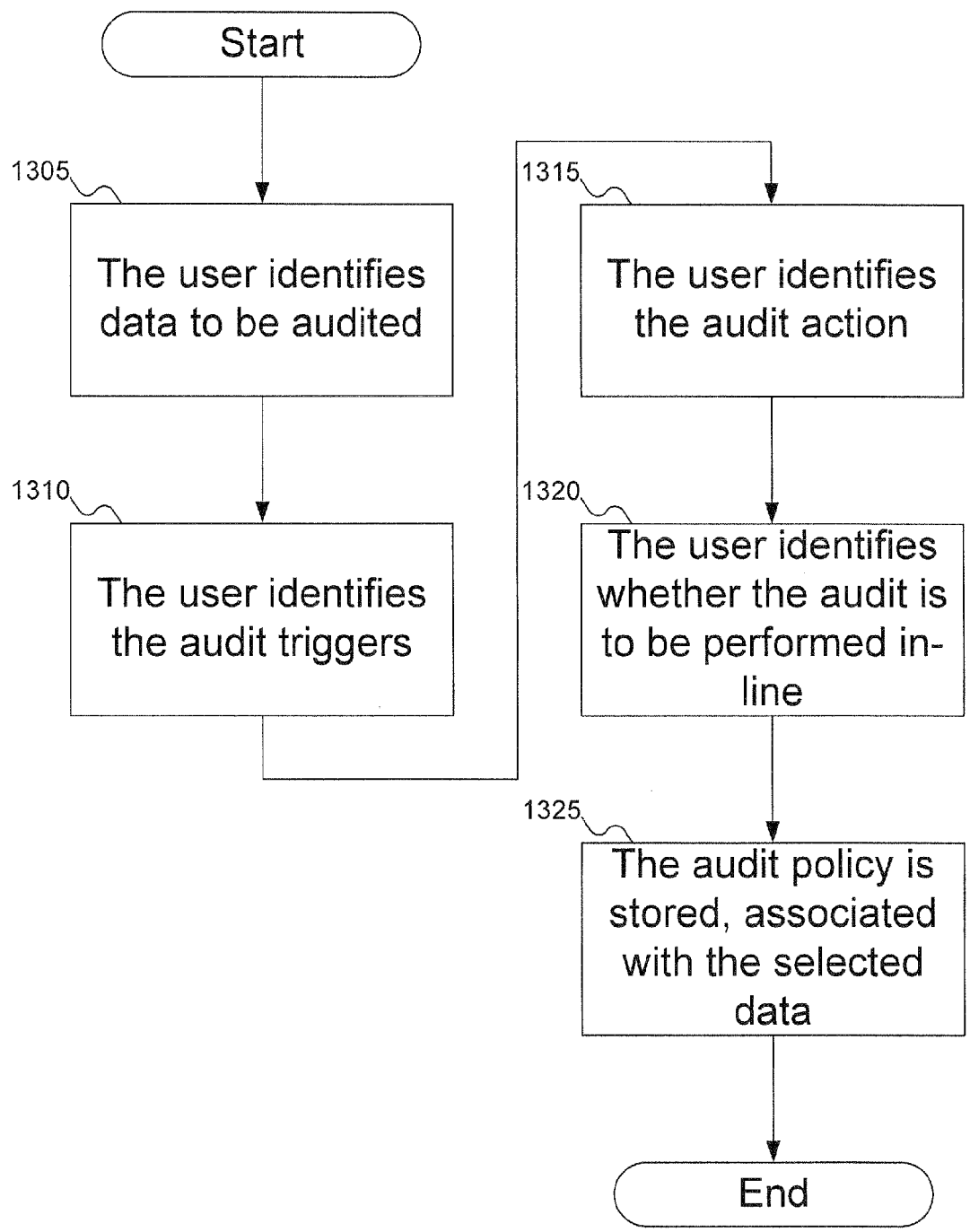
FIG. 13 shows a flowchart of how the audit policy is defined in the identity provider of FIG. 7.

FIG. 13 shows a flowchart of how the audit policy is defined in the identity provider of FIG. 7. At block 1305, the user identifies the pieces of data for which the audit is to be performed. As discussed above with reference to FIGS. 7 and 10A-10B, the audit can be associated with a single datum, with multiple data, or with no particular datum to be included in the security token. At block 1310, the user identifies the triggers for the audit. As described above, the audit triggers can be data that, when included in the security token, are considered by the user sufficiently important to trigger an audit. At block 1315, the user identifies the audit action to be taken. As described above, the audit action can include an SMS message or an e-mail message (potentially including additional information), a telephone call (automated or manual), or some other action desired by the user. At block 1320, the user identifies whether the audit is to be performed in-line before the security token is transmitted to the client (and thence to the relying party). Finally, at block 1325, once the identity provider has all the data needed to carry out the audit, the identity provider stores the audit policy, which is associated with the data.

Figure 14A:
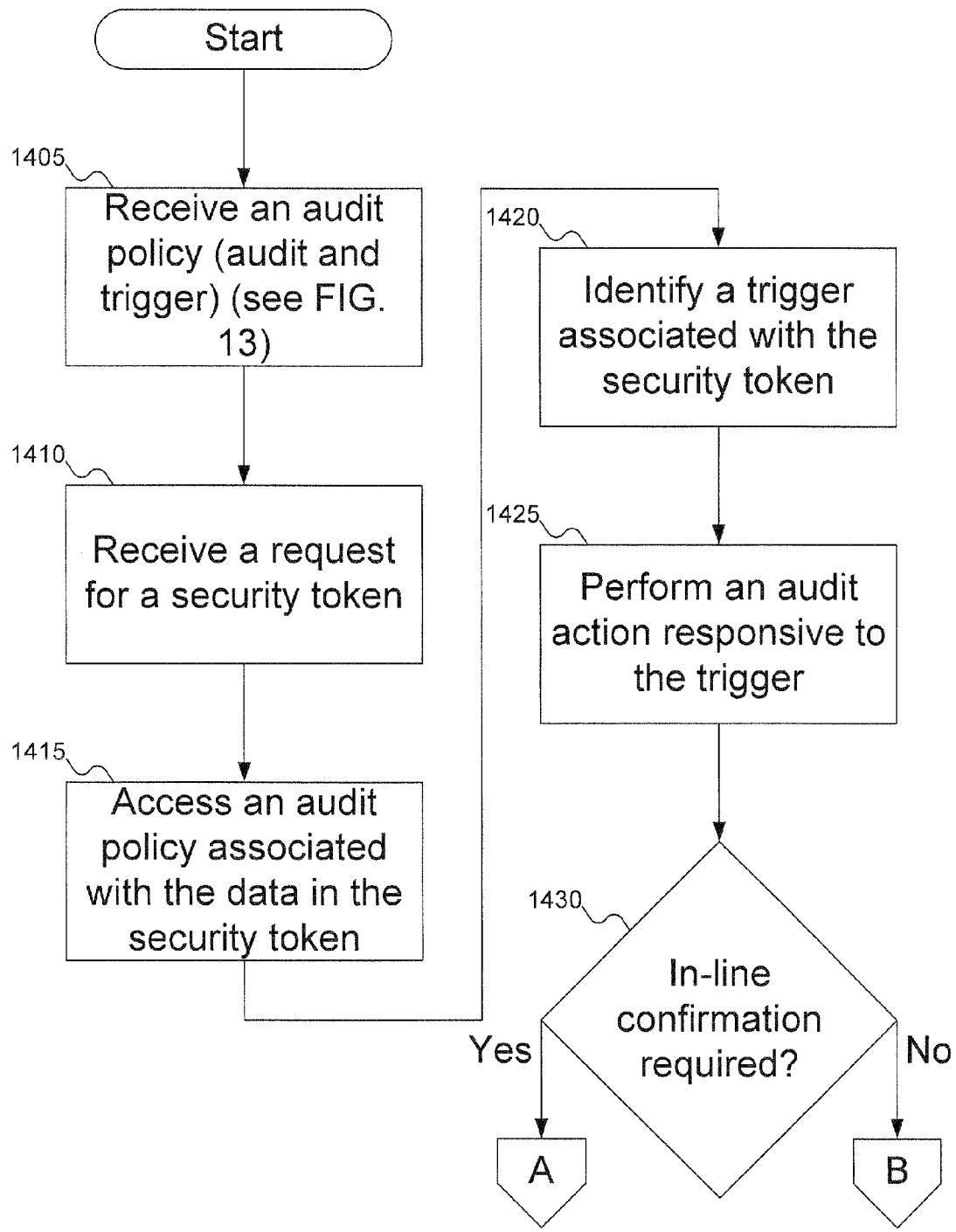
FIGS. 14A-14B show a flowchart of a procedure to perform an audit in the identity provider of FIG. 7.
Figure 14B:
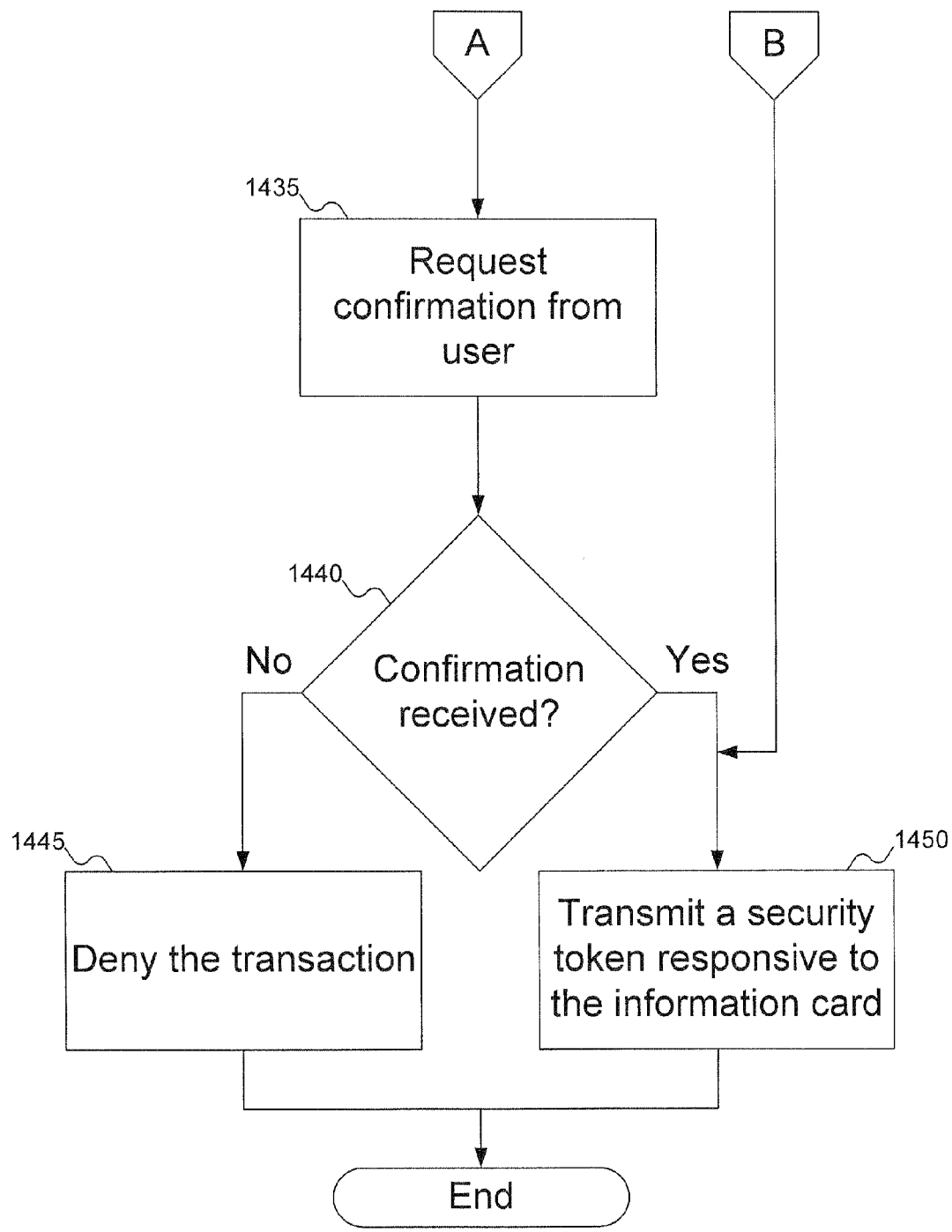

FIGS. 14A-14B show a flowchart of a procedure to perform an audit in the identity provider of FIG. 7. In FIG. 14A, at block 1405, the identity provider receives an audit policy. FIG. 13, discussed above, provides more detail as to how this can be accomplished. A person skilled in the art will recognize that the user can define the audit policy once, and it can be triggered and performed numerous times. A person skilled in the art will further recognize that the audit policy can be defined at a time far removed from when the audit policy is accessed and the audit performed.

At block 1410, the identity provider receives a request for a security token. As discussed above with reference to FIG. 1, the request for the security token can include the data to be included as claims in the security token. At block 1415, the identity provider identifies the audit policy/policies associated with the data to be included in the security token. As discussed above with reference to FIGS. 7 and 10A-10B, the audit policy/policies might not be associated with a particular datum, but with other aspects of the security token; a person skilled in the art will recognize how FIGS. 14A-14B can be modified where the audit is not dependent on a datum to be included in the security token. (In the remaining discussion of FIGS. 14A-14B, the focus is on a single audit policy, but a person skilled in the art will recognize that if there multiple audit policies associated with the selected information card, they can be applies sequentially, in parallel, or in any other desired order.) At block 1420, the identity provider identifies a trigger in the audit policy. At block 1425, the identity provider performs an audit in response to the trigger. This means that if the trigger occurred, the audit is performed; if the trigger did not occur, then no audit is performed (and the rest of FIGS. 14A-14B become irrelevant). At block 1430, the identity provider determines if in-line confirmation of the audit is required.

At block 1435 (FIG. 14B), assuming in-line confirmation of the audit is required, then the identity provider waits for confirmation. At block 1440, the identity provider determines if confirmation is received or denied by the user. At block 1445, if the user denied confirmation of the audit, then the transaction is denied. Otherwise, at block 1450, the security token is transmitted responsive to the selected information card and the relying party's security policy. Block 1450 is also reached if, back at block 1430 on FIG. 14A, the audit policy does not require in-line confirmation, in which case the security token can be transmitted without waiting for confirmation of the audit.

In the description above, the focus has been on the audit service being managed by the identity provider. But a person skilled in the art will recognize that the audit service does not need to be managed by the identity provider. Provided that the audit service can interface with the party responsible for issuing the security token, the audit service can be independent of the identity provider. Thus, for example, embodiments of the invention could have the audit service function performed by the secure token service, or by a machine separate from the identity provider and the secure token service.

While the above discussion discusses transactions that are generally commercial in nature, a person skilled in the art will recognize that embodiments of the invention can be used in other contexts. For example, the relying party might be offering a service that does not require a transfer of finances from the user, but still request some non-identity information from the user. In such a situation, embodiments of the invention can be used to perform audits of such transactions.

Figure 15:
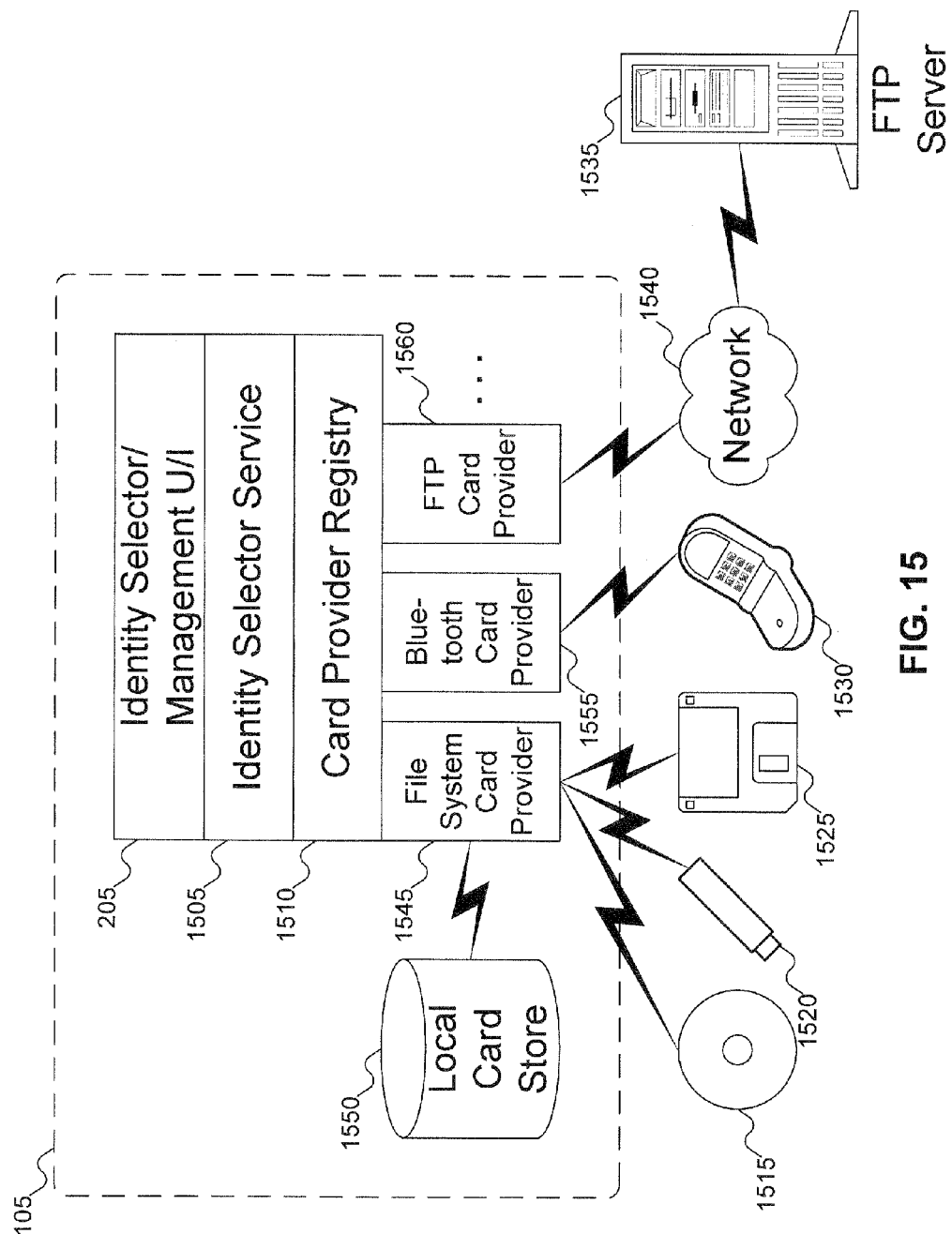
FIG. 15 shows additional details about the system of FIG. 2.

Performing a Transaction without Storing Information Card Information on the Computer System FIG. 15 continues the detail of computer system 105. In FIG. 15, details of other components of computer system 105 are shown. Computer system 105 is shown as including card selector 205, which in FIG. 15 is shown with the alternative name of identity selector/management user interface.

Identity selector/management user interface 205 interfaces not only with the user, but also with identity selector service 1505, which is responsible for managing the information cards available on computer system 105. Identity selector service 1505 interfaces with card provider registry 1510, which is responsible for managing pluggable card providers, which in turn access card stores, both local and pluggable. Pluggable card stores can include card stores on discs such as disc 1515 (which could be a compact disc (CD), digital video disc (DVD), or any other form of optical storage), flash drive 1520, which is shown as a USB flash drive, floppy disk 1525, cellular telephone 1530, or file transfer protocol (FTP) server 1535 (which can be accessed via network 1540). A person skilled in the art will recognize that the pluggable card stores shown in FIG. 15 are merely exemplary, and that any device that can store card information can be used (for example, a personal digital assistant (PDA)).

To manage the interface between the pluggable card stores and the user, various card providers can be used. FIG. 15 shows three such providers. File system card provider 1545 is responsible for managing pluggable card stores that use a file system. In FIG. 15, file system card provider 1545 is shown as interfacing with disc 1515, flash drive 1520, and floppy disk 1525, as these devices typically use file systems to store information. File system card provider 1545 can also be used to access local card store 1550, which stores cards that are installed on computer system 105. Bluetooth card provider 1555 is shown as interfacing with devices that use Bluetooth: in FIG. 15, cellular telephone 1530 is shown as providing this interface technology. FTP card provider 1560 is shown as interfacing with FTP server 1535 via network 1540. A person skilled in the art will recognize that there can be any number of different interfaces, depending on the different devices that can be used to store information cards. For example, there can be providers to manage pluggable card stores on smartcards or HTTP servers (not shown in FIG. 15).

Not shown in FIG. 15 are the connectors that provide the physical interface between the various pluggable card stores and computer system 105. These physical interfaces, which include various connectors, can include various drives, such as a disc drive (CD, DVD, or other optical format, among other possibilities) or a floppy disk drive, a USB port, or a network connection (which can be a wired or wireless connection). Other connectors can include serial ports, parallel ports, IEEE 1394 ports (commonly known as FireWire), telephone jacks, and so on.

As should be apparent from FIG. 15, a "pluggable card store" does not necessarily require that the card store be carried by the user. For example, FTP server 1535 is a machine, remote to computer system 105, which stores information about information cards for the user. A user would not be likely to carry FTP server 1535 in his pocket: an FTP server is generally not considered "portable". But because the information cards stored on FTP server 1535 can be accessed from computer system 105 without the information cards having to be installed on computer system 105, FTP server 1535 is considered to be "pluggable". It is also worth noting that even though FTP server 1535 is remote from computer system 105, the information cards stored in FTP server 1535 are still considered to be available at computer system 105 (although the user might have to request a connection to FTP server 1535 to make the information cards available at computer system 105). A person skilled in the art will recognize other ways in which card stores can be considered pluggable without being portable: for example, via a secure remote connection to another machine the user trusts, such as the user's home computer.

Figure 16:
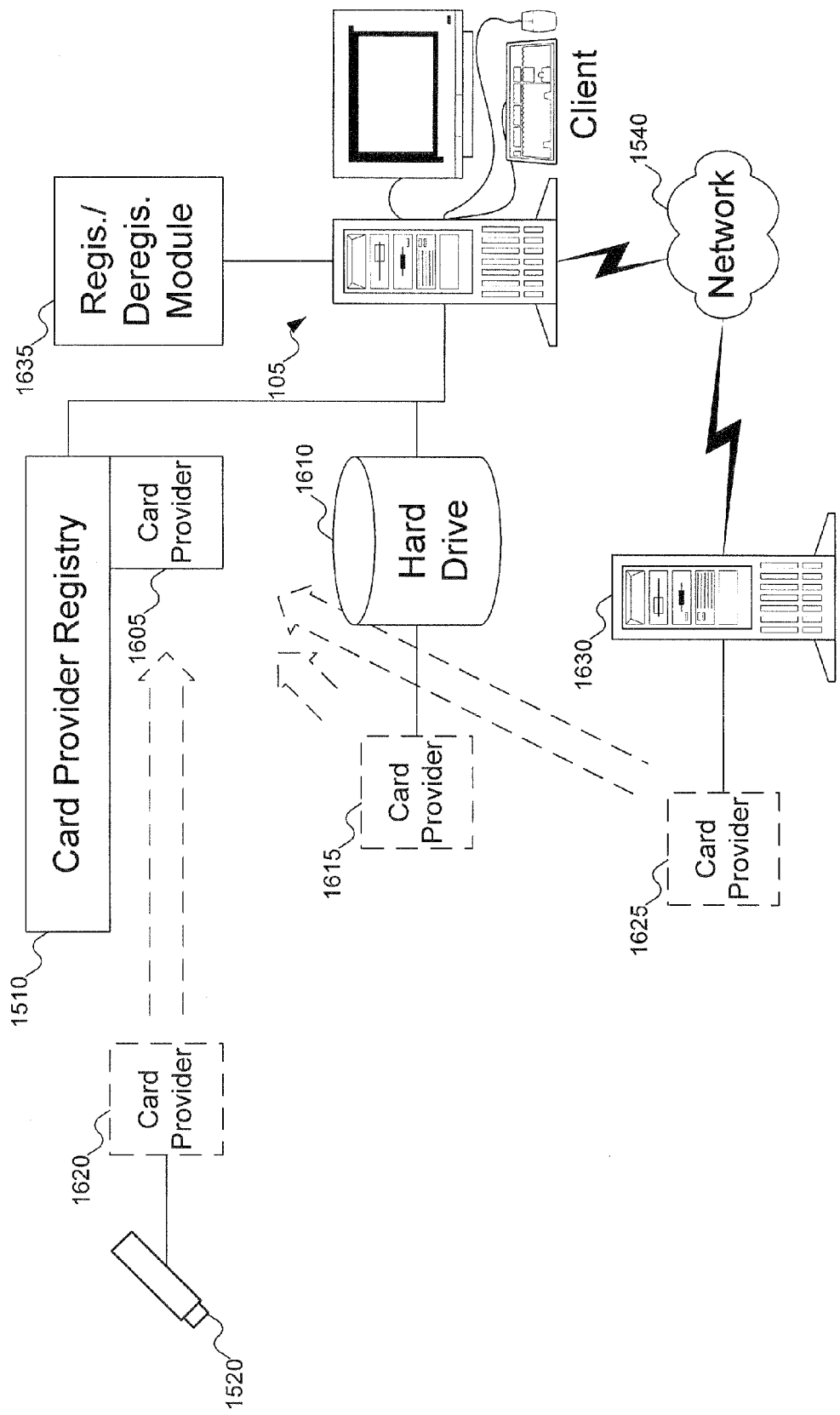
FIG. 16 shows different locations from which the pluggable card providers of FIG. 15 can be installed in the system of FIG. 2.

FIG. 16 shows different locations from which the pluggable card providers of FIG. 15 can be installed in the system of FIG. 2. In FIG. 16, computer system 105 is shown with card provider registry 1510; the other elements of FIG. 15 are not shown in FIG. 16. For any of a number of reasons, card provider 1605 is to be plugged into card provider registry 1510. These reasons can include that computer system 105 is being started, or that a pluggable card store is to be accessed that is accessed via card provider 1605, among other possibilities.

Computer system 105 can install card provider 1605 from an internal hard drive, such as hard drive 1610. When present on hard drive 1610, card provider 1605 can reside as software 1615, which can then be installed as pluggable card provider 1605. Alternatively, card provider 1605 can be loaded from software 1620 on pluggable card store 1520. (While FIG. 16 shows software 1620 being installed from flash drive 1520 as the pluggable card store, a person skilled in the art will recognize that software 1620 can be stored on any pluggable card store.)

In yet another alternative, card provider 1605 can be installed from software 1625, stored on machine 1630, which can be reached from computer system 105 via a network, such as network 1540. Machine 1630 can be an external source of card provider 1625. For example, machine 1630 can offer as a download the latest version of card provider 1625. Computer system 105 can download and install software 1625 as card provider 1605, which would potentially provide the most complete set of features for accessing pluggable card store 1520.

A person skilled in the art will recognize that hard drive 1610, pluggable card store 1520, and machine 1630 are examples of different places from which card provider 1605 can be installed. A person skilled in the art will recognize that there can be other sources of software for card provider 1605, as appropriate.

Figure 17:
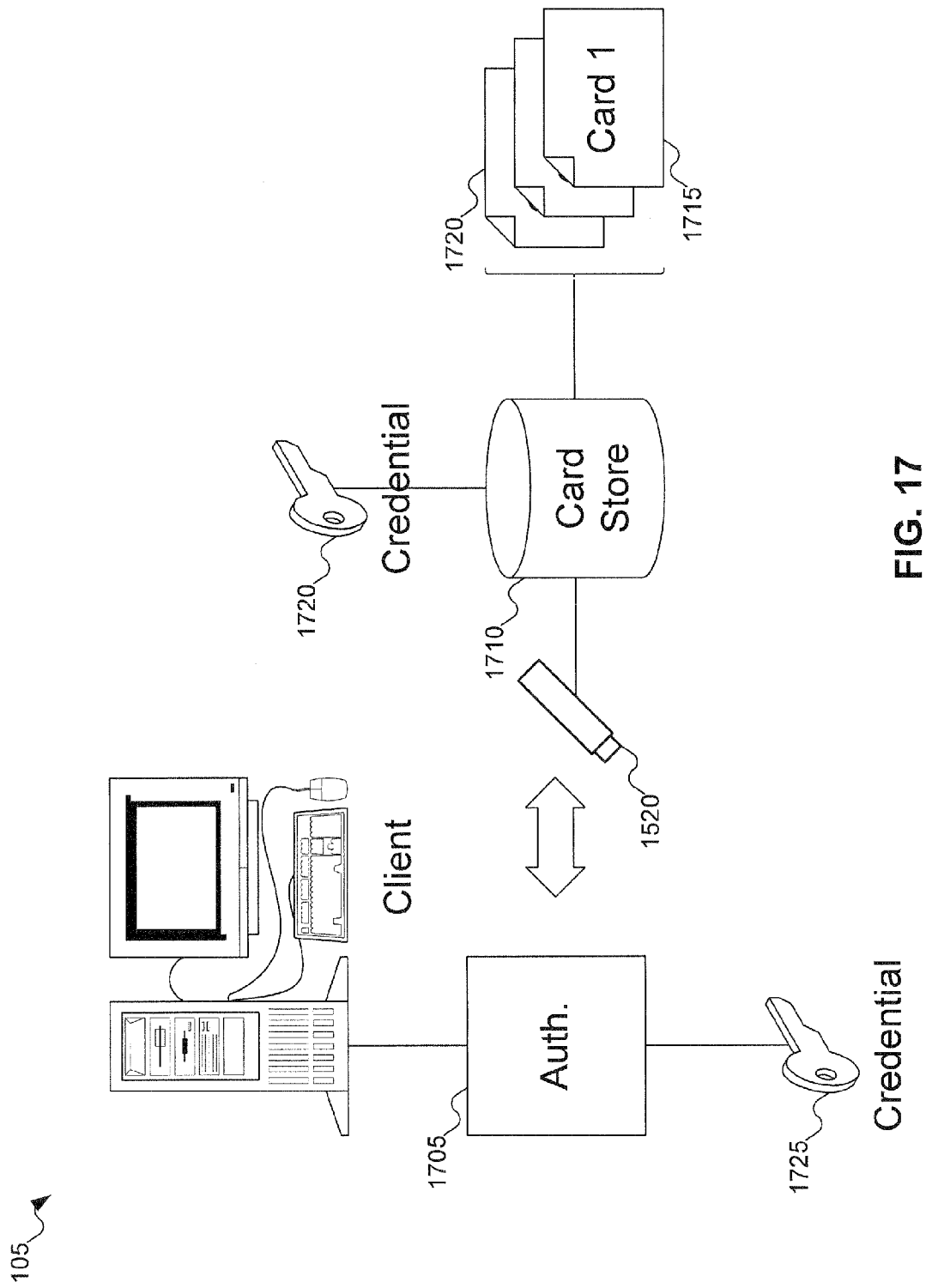
FIG. 17 shows the system of FIG. 2 supporting a user authenticating a pluggable card store.

FIG. 17 shows additional details about the system of FIG. 2 using of pluggable card stores. In FIG. 17, computer system 105 is shown as including authenticator 1705. Authenticator 1705 is used when the pluggable card store is secured in some manner. For example, the pluggable card store can be encrypted with an encryption key: access to the information cards stored on the pluggable card store would require the user providing the decryption key. Authenticator 1705 is used in this situation, to authenticate a request to access data on a pluggable card store.

In FIG. 17, pluggable card store 1520 is shown with card store 1710, which stores information cards, such as information card 1715. Pluggable card store 1520 includes credential 1720: before a user can access data on pluggable card store 1520, the user must provide a matching credential. Authenticator 1705 then provides credential 1725 to pluggable card store 1520 in response to the request for authentication, after which (assuming credential 1725 matches credential 1720) the user can access card store 1710 on pluggable card store 1520.

Credentials "match" when the user provides the appropriate credential used to respond to the authentication request. In some embodiments, credential 1725 matches credential 1720 by being identical to credential 1720. In other embodiments, credential 1725 matches credential 1720 by being a corresponding, non-identical credential—for example, if credential 1720 is a public key, credential 1725 can match credential 1720 by being the corresponding private key. A person skilled in the art will recognize other ways in which credentials can "match".

Although not shown in FIG. 17, computer system 105 can optionally store credential 1725. For example, credential 1725 might be used to authenticate to multiple card stores, not just pluggable card store 1520. By storing credential 1725 in a store on computer system 105, computer system 105 can provide credential 1725 to multiple card stores to authenticate the user to the multiple card stores. In this manner, computer system 105 can authenticate multiple card stores without the user having to provide credentials individually for each card store that requires authentication.

Whether computer system 105 stores credential 1725 can be a configurable option. For example, a machine that is not a public machine, such as a personal computer, can include such storage. The machine can also be configured to automatically store credential 1725 in the storage, or can ask the user whether to store a particular credential for the user. On the other hand, if a public machine can be configured to not store the credential, or ask whether to store the credential.

From the preceding discussion, one can see that computer system 105 includes a framework that provides the capability of pluggable card providers offering access to various card stores. Computer system 105 can be in any number of different states. For example, it might be that computer system 105 includes a pluggable card provider, but no pluggable card store 1520 is connected to computer system 105, and so the pluggable card provider is simply present, without being user. Or, a card store, such as pluggable card store 1520, can be connected to computer system 105, but computer system 105 does not include a pluggable card provider capable of providing access to pluggable card store 105. It can also happen that pluggable card store 1520 is connected to computer system 105, and there is a pluggable card provider available on computer system 105 that could interface with pluggable card store 1520, but the pluggable card provider is not yet configured to communicate with pluggable card store 1520. And, of course, pluggable card store 1520 can be connected to computer system 105, which can have a pluggable card provider available to interface, and actually communicating, with pluggable card store 1520.

A person skilled in the art will also recognize that it is possible for computer system 105 to exist without this framework. For example, a brand new computer might not yet have the framework installed to support the pluggable card providers and the pluggable card stores. In that case, this framework can be installed on computer system 105.

Figure 18A:
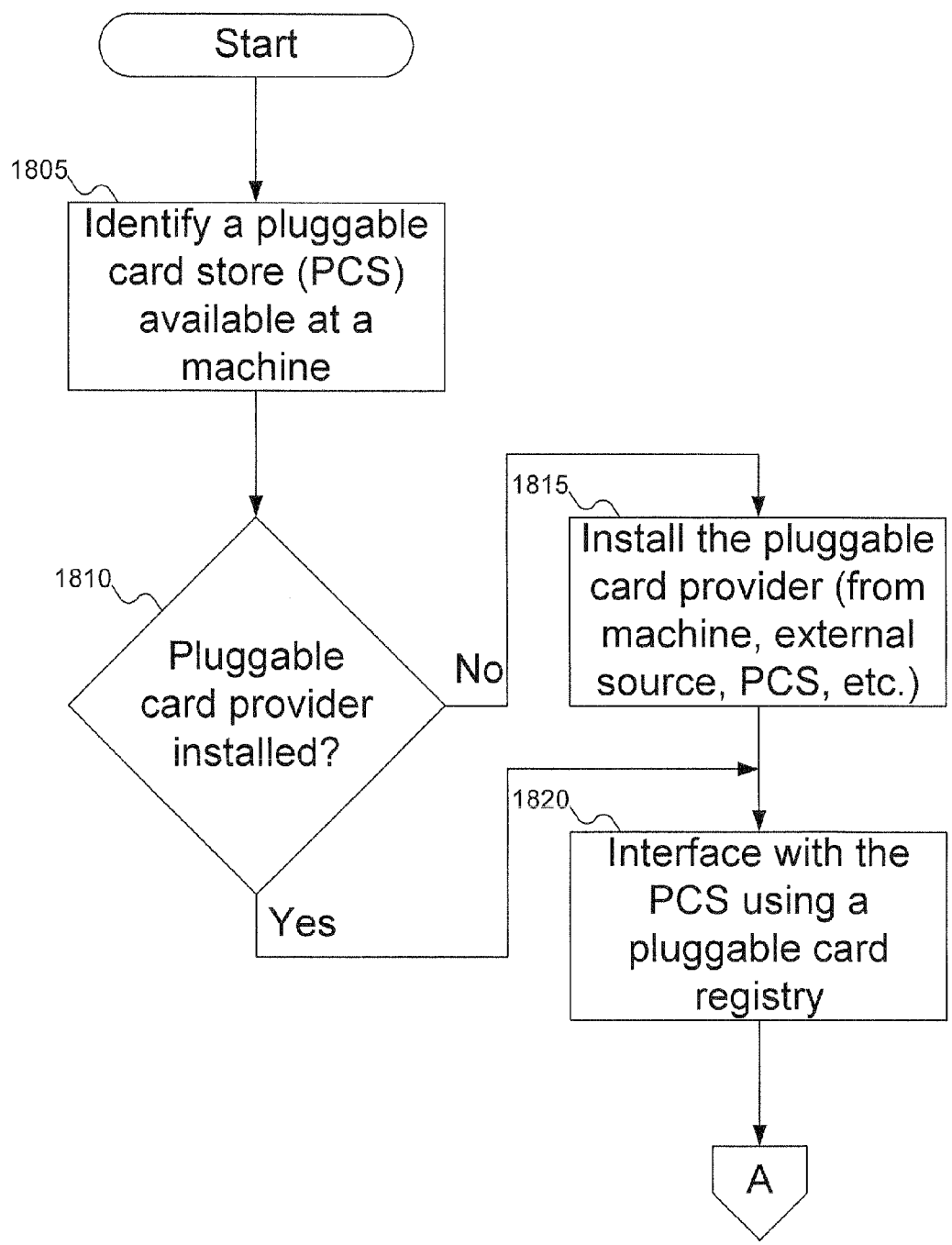
FIGS. 18A-18C show a flowchart of a procedure for processing a newly connected pluggable card store on the machine of FIG. 2.
Figure 18B:
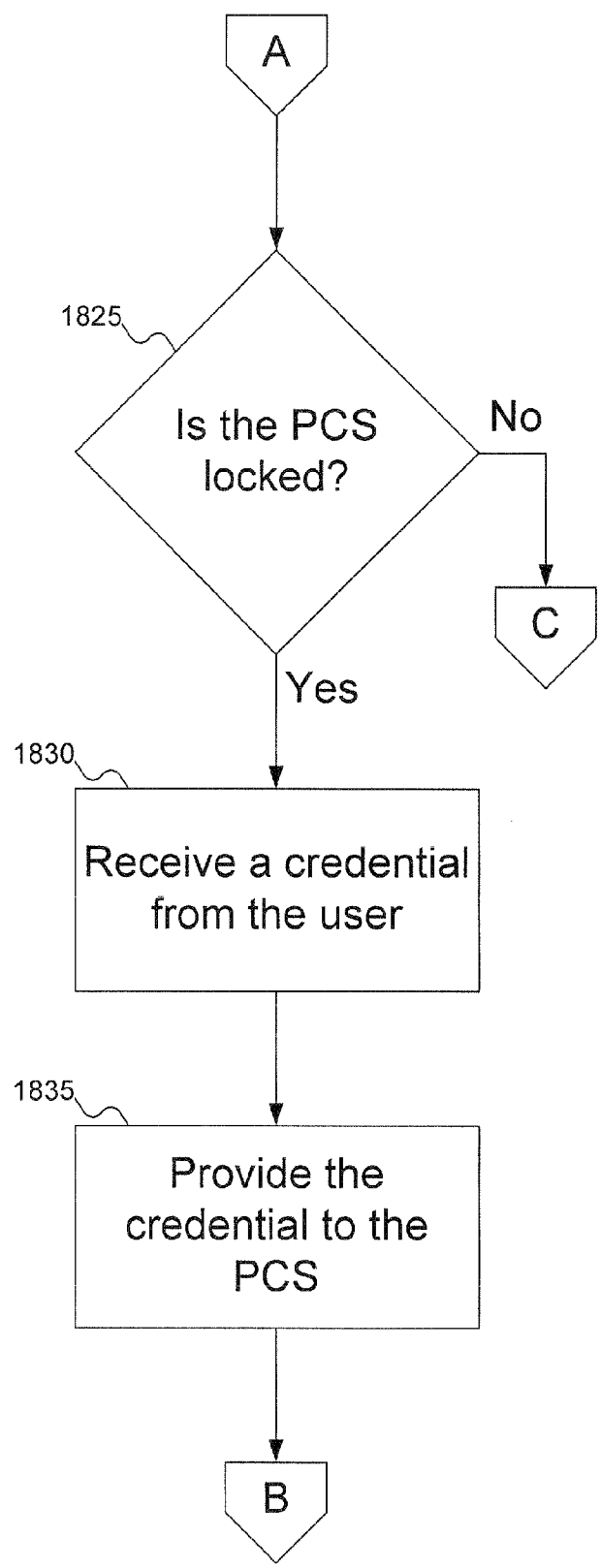
Figure 18C:
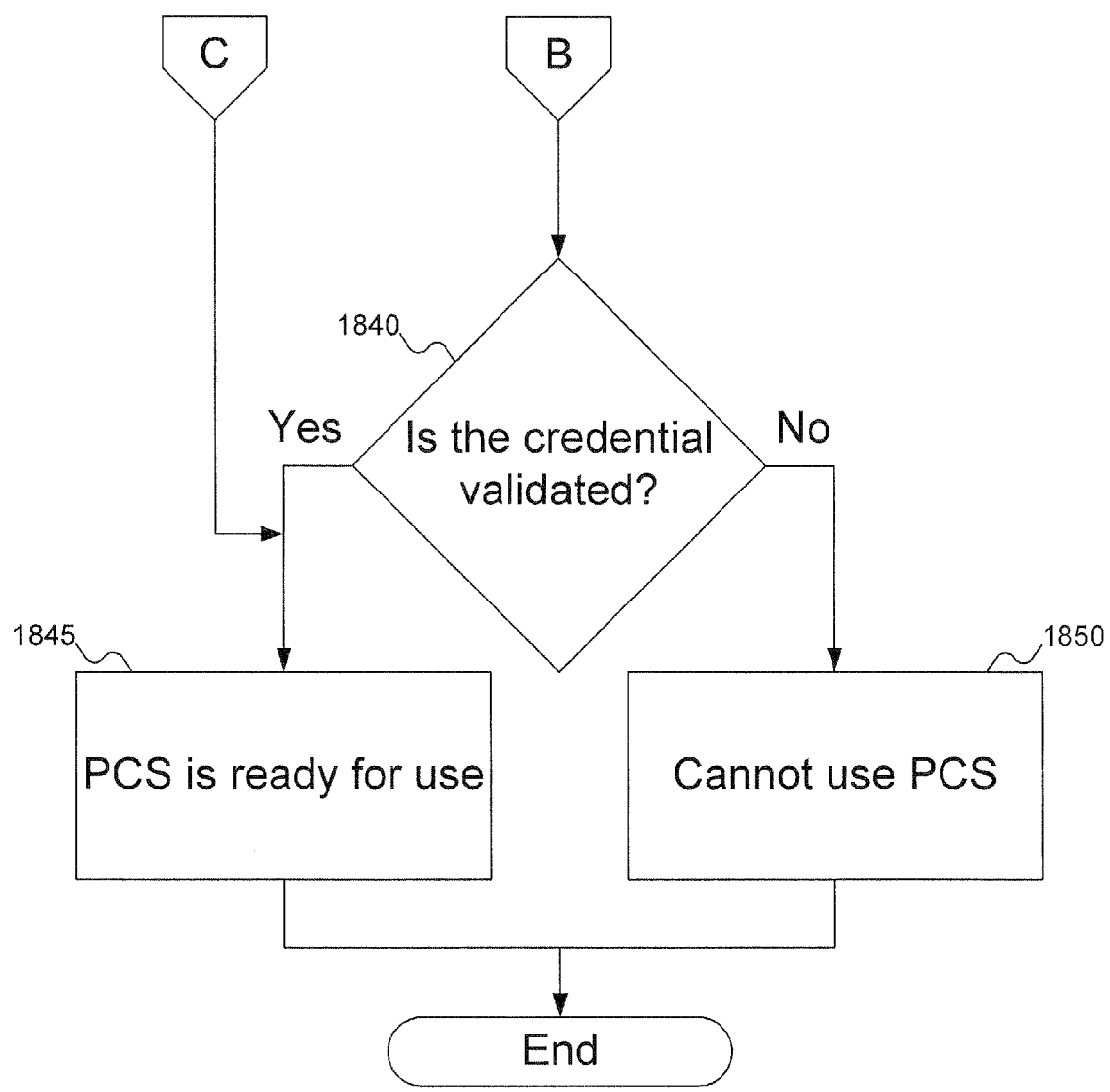

FIGS. 18A-18C show a flowchart of a procedure for processing a newly connected pluggable card store on the machine of FIG. 2. In FIG. 18A, at block 1805, the machine identifies a pluggable card store available at the machine. At block 1810, the machine determines whether a pluggable card provider is installed at the machine: the pluggable card provider is used to access the pluggable card store. If the machine does not have a pluggable card provider to access the pluggable card store, then at block 1815, the machine installs the pluggable card provider from an appropriate source.

At block 1820, once the pluggable card store is installed to access the pluggable card store, the machine interfaces with the pluggable card store using the pluggable card provider. At block 1825 (FIG. 18B), the machine determines whether the pluggable card store is locked. If so, then at block 1830 the machine receives from the user a credential that can be used to authenticate the user to unlock the card store. At block 1835, the machine provides the credential to the pluggable card store.

At block 1840 (FIG. 18C), the machine determines whether the credential was validated (in other words, that the user was properly authenticated). If so, or if the pluggable card store was not locked (as determined at block 1825 of FIG. 18B), then at block 1845 the pluggable card store is ready for use. Otherwise, at block 1850, the user cannot access the pluggable card store.

While FIGS. 18A-18C show one way in which a newly connected pluggable card store can be processed to provide access to the information cards stored on the pluggable card store, a person skilled in the art will recognize that the pluggable card store can be processed in other ways. For example, rather than processing the newly connected pluggable card store when the pluggable card store is connected to the computer system, the pluggable card store can be processed when the user is looking for information cards. For example, this might occur when the user is interacting with the card selector interface at some point in FIG. 19B. Before the information cards are presented to the user, the computer system can discover the available pluggable card stores (including receiving credentials from the user when appropriate) and install the appropriate pluggable card providers in the framework if needed. Then, once the framework would support locating information cards within the pluggable card stores, the computer system could proceed with receiving from the user the identification of the selected information card.

Figure 19A:
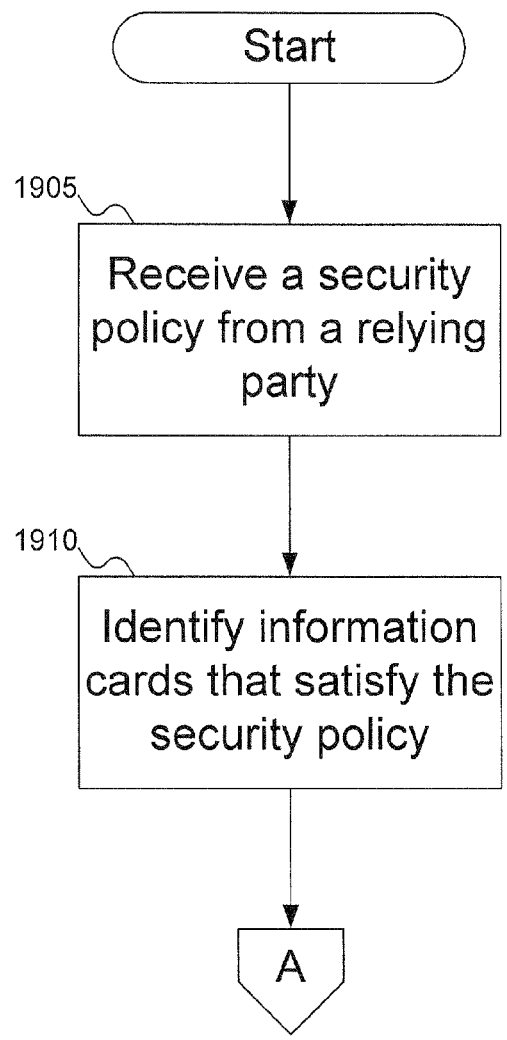
FIGS. 19A-19C show a flowchart of a procedure for using an information card to perform a transaction using the machine of FIG. 2.
Figure 19B:
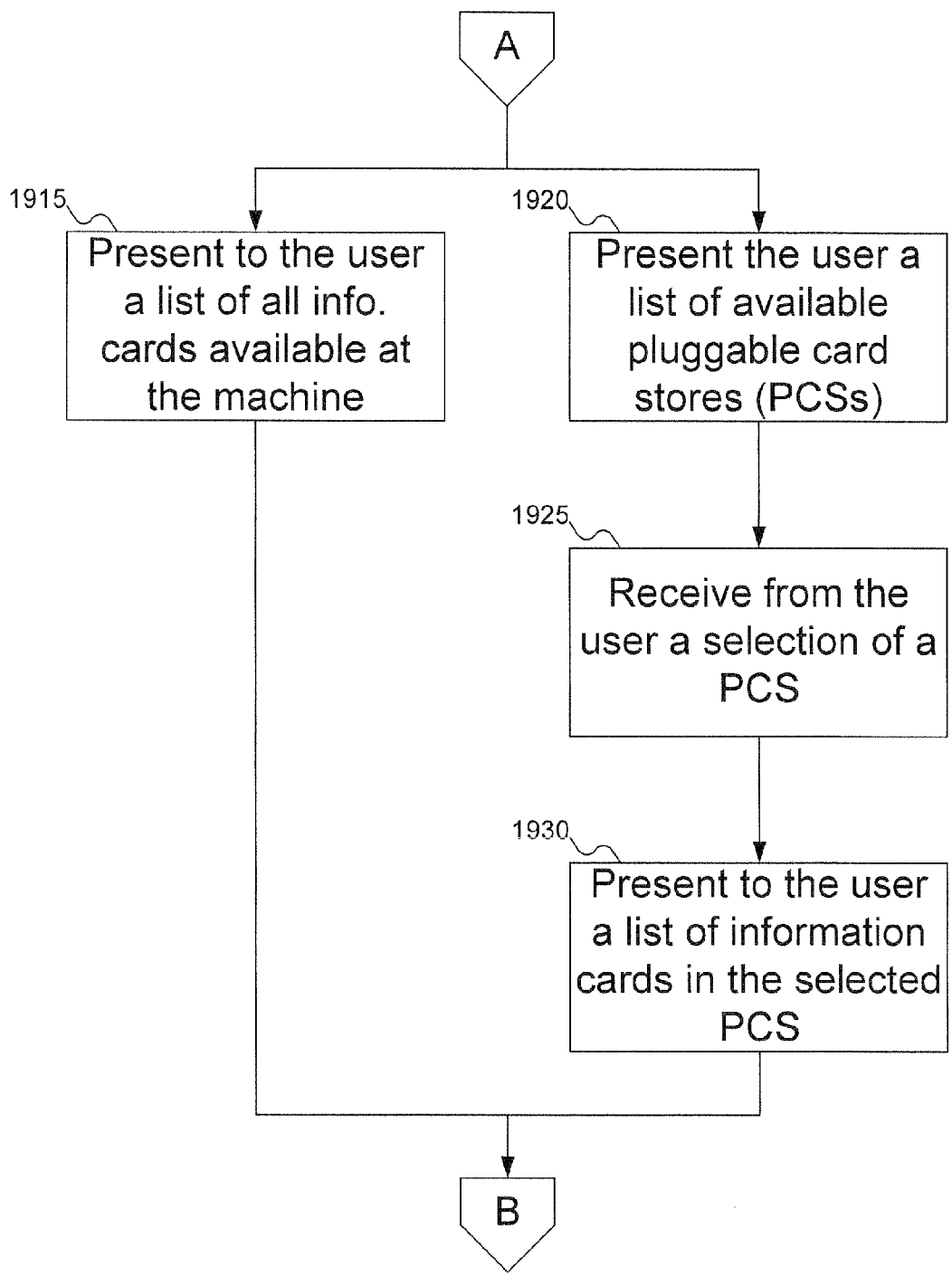
Figure 19C:
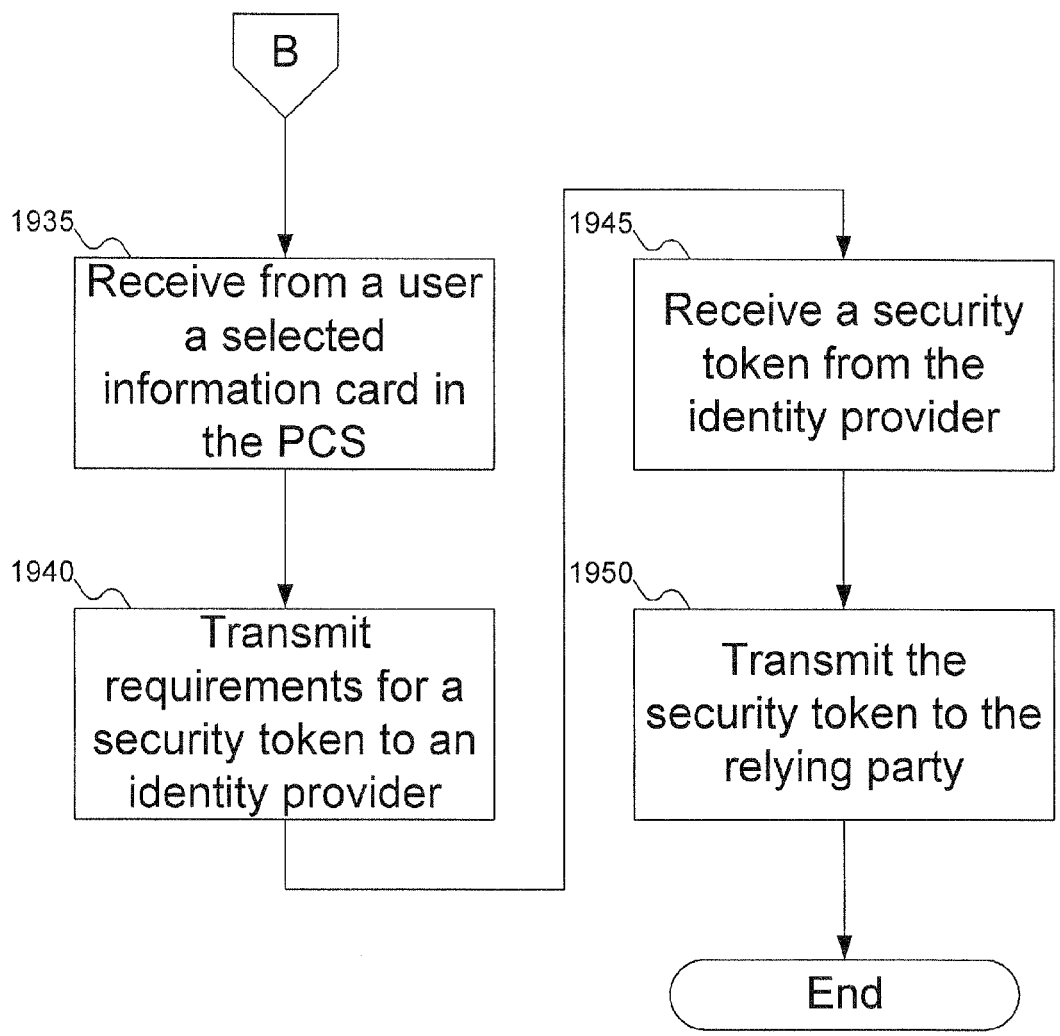

FIGS. 19A-19C show a flowchart of a procedure for using an information card to perform a transaction using the machine of FIG. 2. In FIG. 19A, at block 1905, the system receives a security policy from a relying party. At block 1910, the system identifies information cards that can satisfy the security policy.

At block 1915 (FIG. 19B), the system can present to the user a list of all information cards available at the machine that satisfy the security policy. Alternatively, the system can organize information cards by pluggable card store: at block 1920, the system presents to the user the available pluggable card stores, at block 1925, the system receives from the user a selected pluggable card store, and at block 1930, the system presents to the user the list of information cards on the selected pluggable card store that satisfy the security policy. A person skilled in the art will recognize other ways in which the system can present to the user the available information cards: for example, listing all information cards available at the machine, but distinguishing between information cards that satisfy the security policy and information cards that do not satisfy the security policy.

At block 1935 (FIG. 19C), the system receives the user's selected information card. At block 1940, the system requests a security token from the identity provider. The request identifies what data is to be used in the security token, the form of credential to be generated, and any other data the identity provider needs to generate the security token. At block 1945, the system receives the security token from the identity provider. Finally, at block 1950, the system forwards the security token to the relying party.

Figure 20:
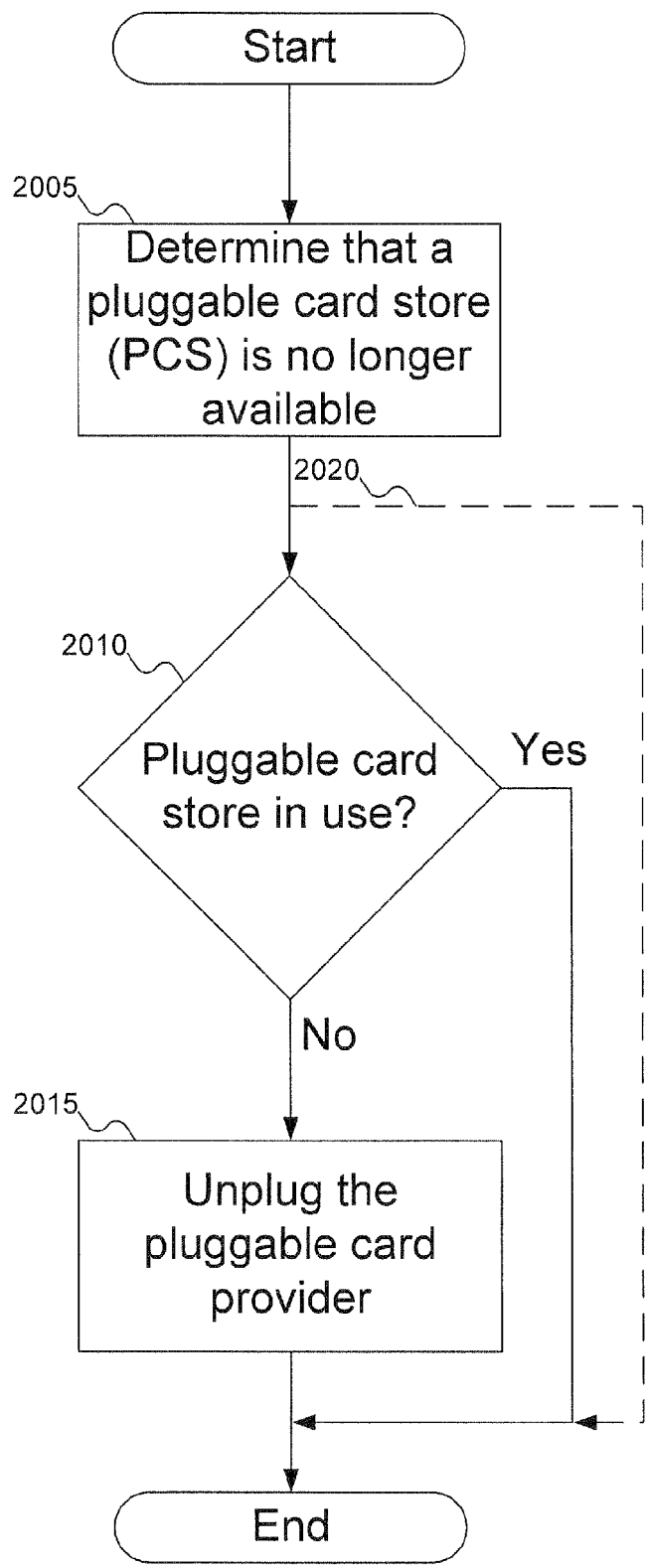
FIG. 20 shows a flowchart of a procedure for processing a newly disconnected pluggable card store on the machine of FIG. 2.

FIG. 20 shows a flowchart of a procedure for processing a newly disconnected pluggable card store on the machine of FIG. 2. In FIG. 20, at block 2005, the machine determines that a pluggable card store is no longer available. This can occur if the user has disconnected the pluggable card store. For example, the user can unplug the pluggable card store from its connector to the computer. Or the user can sever a logical connection to the pluggable card store, as can occur when the pluggable card store is accessed via a network (for example, an FTP server). At block 2010, the machine determines if the pluggable card provider that was used to access the pluggable card store is still being used (for example, to access another card store). If the machine determines that the pluggable card provider is no longer in use, then at block 2015, the machine can unplug the pluggable card provider from the machine.

A person skilled in the art will recognize that the machine can leave the pluggable card provider installed, even if it is not being used (e.g., to access a pluggable card store). This is shown by dashed arrow 2020.

An Example Use Case

A person skilled in the art will recognize that the above-described embodiments of the inventions can be combined, to offer functionality greater than any one of the applications individually can provide. The following example describes one way in which the embodiments can be combined. A person skilled in the art will recognize other ways in which embodiments of the invention can be combined.

Consider a user named John. John is concerned with the proliferation of credentials that he has scattered across a number of web sites on the Internet, because each web site requires John to provide a username and password to access the web site's services. John has registered with his bank's web site so that he can review transactions in his checking, savings, and credit card accounts. John has also registered with his local supermarket chain, which delivers his grocery orders to his house for him, among other web sites. John recognizes that he is having trouble remembering all of the different username and password combinations that the different web sites use, and wants to use information cards to simplify the management of authenticating himself to the various web sites. Because his bank and supermarket are both willing to accept information cards, John can take advantage of information cards to authenticate to both of these parties.

John is also concerned with being able to use his information cards anywhere. Sometimes, John is at work when he decides he wants to make a pot roast for dinner, but he does not have a roast in his refrigerator. In the past, he has used his supermarket's web site to order a roast and some vegetables: John wants to continue to use the convenience of ordering groceries on-line.

But while John trusts his co-workers, he does not want to install his information cards on a work computer. First, John does not have control over which machine he uses on any given day: he, like his co-workers, just sits down at any free machine to do his work. If he wants to be able to order groceries on-line from work, he might have to install his information cards on every computer at work. And ignoring the effort involved in installing his information cards on each machine at work and keeping them synchronized (if data should happen to change), John is worried that he would have no control over his information cards if someone were to steal one of the work computers, or if his company decided to replace an older machine without warning.

John is also concerned about identity theft. He wants to be in complete control over his information. John does not want any information of his to be given out to a person who does not need it, under any circumstances. And having heard rumors that people have spent years trying to clean up their credit histories after suffering identity theft, John wants to have the right to approve the release of any information in advance.

So John selects an identity provider he trusts. By a fortunate coincidence, John's bank happens to offer services as an identity provider, so John selects his bank to manage his information cards. John stores information with his bank—his identity provider. Of course, his bank already has some of the information, so John only supplements the information the bank already has. John creates some information cards that he can use to log into his bank's web site and his supermarket's web site. One particular information card John creates includes all of the information John's bank manages for him, including information about his bank checking account—routing number, account number, and the like. John defines some audit policies, indicating that before any information is released from the identity provider, they need to call him on his cell phone and get confirmation from him to release the information.

John stores copies of the information cards he created on a USB flash drive. He knows from personal experience that the computers at work all have USB ports, and all recognize USB flash drives. Because he knows he is a little careless, John password protects the USB flash drive: until the correct password is provided, the data stored on the USB flash drive cannot be accessed. John feels comfortable that no-one would be able to guess his password, so if he loses the USB flash drive, his data will be sufficiently safe.

Sometime the following week, John decides he needs a few ingredients to cook the dinner he wants that evening. John then goes to his supermarket's web site and selects some groceries. When John is finished, the supermarket's web site prompts John to provide the information needed to complete the transaction. In particular, the supermarket's web site asks John for his shipping address and for the information about the account to debit for the transaction. John opts to use the information card system to satisfy this request.

John plugs his USB flash drive into a USB port on his work computer. John's work computer recognizes the presence of the USB flash drive, hums for a moment, then prompts John for the password to the USB flash drive, which he provides. A few moments later, John's work computer displays the information cards stored on the USB flash drive.

John navigates to the information card on his USB flash drive that represents his bank information, and selects it. The work computer then says that he needs to authenticate himself to the identity provider. John provides the appropriate credential to the identity provider. A few moments later, John's cellular telephone rings. John picks up his cellular telephone and answers the call. The call is an automated call from his identity provider: the computer at the other end of the call informs John that it is being asked to release his shipping address and checking account information. The machine at the other end of the call asks John to press "1" to permit the release of information, or to press "2" to decline to release the information. John presses "1". A few moments later, John sees a graphic on the screen of his work computer that the identity provider has sent the security token to his computer, which has been forwarded to the supermarket's web site. A moment later, John's work computer shows him the transaction details—the list of items purchased and the total purchase price—and a transaction receipt.

John notes the transaction in his checkbook. A moment later, the screen shows a "Thank you!" from the supermarket's web site for making the purchase, with a promise that his groceries will be delivered before 5:00 PM. John makes another mental note to be home by 5:00, so that the perishable groceries do not sit in the hot sun. John removes his USB flash drive from the USB port on his work computer (the computer hums for a moment, then indicates the information cards are no longer available), and he returns to his work.

The following discussion is intended to provide a brief, general description of a suitable machine in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

The invention may be described by reference to or in conjunction with associated data including functions, procedures, data structures, application programs, instructions, etc. which, when accessed by a machine, result in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. An apparatus, comprising:
a machine (135) operative as an identity provider;
a receiver (705) to receive a request for a security token (160), said request for said security token (160) including a security policy (150) and identifying at least one datum (715, 720) to be included in said security token (160);
a transmitter (710) to transmit said security token (160) responsive to said request, said security token (160) responsive to said security policy (150);
at least one audit policy (725) associated with said datum (715, 720) including a trigger (730) based on said security token (160) and an audit action (735); and
an audit operator (740) operative to perform said audit action (735) if said trigger (730) occurs.

2. An apparatus according to claim 1, wherein said audit action (735) includes at least one of an e-mail message (810) to send to a user, an SMS message (805) to send to said user, a log responsive to said audit policy, and an RSS feed responsive to said audit policy.

3. An apparatus according to claim 1, wherein said audit action (735) includes at least one of a first message (810)

relating to said security token (160) to send to a user and a second message (810) identifying a client (105) requesting said security token (160) to send to said user.

4. An apparatus according to claim 3, wherein said audit action (735) further includes a third message (810) including details of a transaction (815) involving said security token (160) to send to said user.

5. An apparatus according to claim 4, wherein said details of a transaction (815) include an identity of a relying party (130) receiving said security token (160).

6. An apparatus according to claim 1, wherein the receiver (705) is operative to receive the audit policy (725) from a user.

7. An apparatus according to claim 1, wherein the transmitter (710) is operative to transmit said security token (160) responsive to a user approving said audit action (735).

8. An apparatus according to claim 1, wherein the machine (135) includes the receiver (705), the transmitter (710), the at least one audit policy (725), and the audit operator (740).

9. A method for triggering an audit, comprising:
   receiving (1410) at an identity provider (135) a request for a security token (160), the request including a security policy (150) and identifying at least one datum (715, 720);
   accessing (1415) an audit policy (710) associated with the datum (715, 720);
   identifying (1420) a trigger (730) associated with the security token (160);
   performing (1425) an audit action (735) responsive to the identified trigger (730); and
   transmitting (1450) from the identity provider (135) the security token (160) responsive to the received security policy (150).

10. A method according to claim 9, wherein:
    performing (1425) an audit action (735) includes performing at least one of sending an e-mail (810) to a user, sending an SMS message (805) to the user, logging information generated from the security token, and an RSS feed generated from the security token.

11. A method according to claim 9, wherein performing (1425) an audit action (735) includes informing a user (810) about at least one of the contents of the security token (160) and an identity of a client (105) requesting the security token (160).

12. A method according to claim 11, wherein performing (1425) an audit action (735) further includes informing the user about details of a transaction (815) involving the security token (160).

13. A method according to claim 12, wherein informing the user about details of a transaction (815) includes identifying a relying party (130) receiving the security token (160).

14. A method according to claim 9, further comprising receiving (130) the audit policy (725) from a user, the audit policy (725) identifying the trigger (730) and the audit action (735).

15. A method according to claim 9, wherein:
    performing (1425) an audit action (735) includes requesting (1435) a user to approve the transmission of the security token (160); and
    transmitting (1450) a security token (160) includes transmitting (1450) the security token (160) only if the user approves (1440) the transmission of the security token (160).

16. A method according to claim 15, wherein transmitting (1450) the security token (160) includes denying (1445) a transaction (815) if the user does not approve the transmission of the security token (160).

17. An article, comprising a non-transitory storage medium, said non-transitory storage medium having stored thereon instructions that, when executed by a machine, result in:
    receiving (1410) a request for a security token (160), the request including a security policy (150) and identifying at least one datum (715, 720);
    accessing (1415) an audit policy (710) associated with the datum (715, 720);
    identifying (1420) a trigger (730) associated with the security token (160);
    performing (1425) an audit action (735) responsive to the identified trigger (730); and
    transmitting (1450) the security token (160) responsive to the received security policy (150).

18. An article according to claim 17, wherein:
    performing (1425) an audit action (735) includes performing at least one of sending an e-mail (810) to a user, sending an SMS message (805) to the user, logging information generated from the security token, and an RSS feed generated from the security token.

19. An article according to claim 17, wherein performing (1425) an audit action (735) includes informing a user (810) about at least one of the contents of the security token (160) and an identity of a client (105) requesting the security token (160).

20. An article according to claim 19, wherein performing (1425) an audit action (735) further includes informing the user about details of a transaction (815) involving the security token (160).

21. An article according to claim 20, wherein informing the user about details of a transaction (815) includes identifying a relying party (130) receiving the security token (160).

22. An article according to claim 17, wherein said non-transitory storage medium has stored thereon further instructions that, when executed by the machine, result in receiving (130) the audit policy (725) from a user, the audit policy (725) identifying the trigger (730) and the audit action (735).

23. An article according to claim 17, wherein:
    performing (1425) an audit action (735) includes requesting (1435) a user to approve the transmission of the security token (160); and
    transmitting (1450) a security token (160) includes transmitting (1450) the security token (160) only if the user approves (1440) the transmission of the security token (160).

24. An article according to claim 23, wherein transmitting (1450) the security token (160) includes denying (1445) a transaction (815) if the user does not approve the transmission of the security token (160).

* * * * *